United States Patent
Bourgeois et al.

(10) Patent No.: US 10,390,548 B2
(45) Date of Patent: *Aug. 27, 2019

(54) METHOD FOR EXTRACTING PEA PROTEINS

(71) Applicant: COSUCRA GROUPE WARCOING S.A., Warcoing (BE)

(72) Inventors: Audrey Bourgeois, Epernay (FR); Julie Lebesgue, Mouchin (FR); Frédéric Mansy, Hyon (BE); Eric Bosly, Tournai (BE)

(73) Assignee: Cosucra Groupe Warcoing S.A., Warcoing (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,261

(22) PCT Filed: Nov. 18, 2014

(86) PCT No.: PCT/EP2014/074939
§ 371 (c)(1),
(2) Date: May 9, 2016

(87) PCT Pub. No.: WO2015/071498
PCT Pub. Date: May 21, 2015

(65) Prior Publication Data
US 2016/0286831 A1    Oct. 6, 2016

(30) Foreign Application Priority Data

Nov. 18, 2013  (EP) .................................... 13193383
Nov. 18, 2013  (EP) .................................... 13193388

(51) Int. Cl.
*A23J 1/14* (2006.01)
*A23J 3/14* (2006.01)

(52) U.S. Cl.
CPC .............. *A23J 1/148* (2013.01); *A23J 1/14* (2013.01); *A23J 3/14* (2013.01); *A23Y 2220/03* (2013.01); *A23Y 2220/35* (2013.01)

(58) Field of Classification Search
CPC ................................ A23J 1/148; A23J 3/14
USPC ........................................................ 426/46
See application file for complete search history.

(56) References Cited

U.S. PATENT DOCUMENTS

| 2004/0091600 A1* | 5/2004 | Salome .................... C08B 30/04 426/622 |
| 2008/0226810 A1* | 9/2008 | Passe ........................ A23J 1/14 426/656 |
| 2008/0226811 A1 | 9/2008 | Boursier et al. |
| 2013/0017310 A1 | 1/2013 | Dhalleine et al. |

FOREIGN PATENT DOCUMENTS

| FR | 2 889 416 A1 | 2/2007 |
| FR | 2 889 417 A1 | 2/2007 |
| WO | 2010022702 A1 | 3/2010 |

OTHER PUBLICATIONS

Fredrikson, M. et al. 2001. J. Agric. Food Chem. 49: 1208-1212 (Year: 2001).*
Camacho et al. 1991. (Year: 1991).*
PCT International Search Report and Written Opinion dated Feb. 17, 2015 for PCT International Patent Application No. PCT/EP2014/074939, 10 pages.
Camacho L M et al., entitled "Mejoramieto nutricional de legumbres de consumo habitual fermentado por cultivos del grano lactobacilus," vol. 16, Jan. 1, 1991, pp. 5-11.
Chapter 4: Fermentation of Grain Legumes, Seeds and Nuts in Latin America and the Caribbean ED—Deshpande; S S, Fermented Grain Legumes, Deeds and Nuts: A global perspective (Book Series: FAO Agricultural Services Bulletin), vol. 142, Jan. 1, 2000, pp. 99-105.
Schindler S et al., entitled "Improvement of the Aroma of Pea (*Pisum sativum*) Protein Extracts by Lactic Acid Fermentation," Food Biotechnology, vol. 26, No. 1, Jan. 1, 2012, pp. 58-74.
Khattab R Y et al., entitled "Nutritional quality of legume seeds as affected by some physical treatments, Part 1: Protein quality evaluation," LWT—Food Science and Technology, vol. 42, No. 6, Jul. 1, 2009, pp. 1107-1112.
Third Party Observations submitted to the European Patent Office in connection with EP 14815249.9 on Jan. 8, 2018.
Frederikson et al., Production Process for High-Quality Pea-Protein Isolate with Low Content of Oligosaccharides and Phytate, J. Agric. Food Chem., 2001, 49, 1208-1212.
Gibson et al., Functional Foods, Woodhead Publishing Limited, 2001, 9.2 "Improving pea protein," p. 213.
Sanni et al., "Production of α-galactosidase by Lactobacillus plantarum isolated from diverse sources," J. Basic Microbiol., 35, (1995), 6, 427-432.
Leblanc et al., "Reduction of α-galactooligosaccharides in soyamilk by Lactobacillus fermentum CRL 722: in vitro and in vivo evaluation of fermented souamile," J. Applied Microbiology 2004, 97, 876-881.

* cited by examiner

*Primary Examiner* — Hamid R Badr
(74) *Attorney, Agent, or Firm* — Amster, Rothstein & Ebenstein LLP

(57) ABSTRACT

The present invention relates to a method for extracting and purifying pea proteins. Hereto, according to the invention, peas are subjected to fermentation, preferably by lactic acid bacteria, prior to milling. Preferably the method for extracting pea proteins comprises the steps of: (a) subjecting an aqueous composition comprising peas to fermentation; (b) milling said peas; (c) fractionating said milled peas so as to obtain at least one protein comprising fraction; and (d) isolating pea proteins from said at least one protein comprising fraction. Also described are food or feed products comprising the pea proteins obtained according to the invention.

19 Claims, 10 Drawing Sheets

METHOD FOR EXTRACTING PEA PROTEINS

CROSS-REFERENCE TO RELATED APPLICATIONS

This application is a U.S. national stage entry under 35 U.S.C. § 371 of PCT International Patent Application No. PCT/EP2014/074939, filed Nov. 18, 2014, which claims priority to European Patent Application No. 13193383.0, filed Nov. 18, 2013, European Patent Application No. 13193388.9, filed Nov. 18, 2013, and Belgian Patent Application No. 2014/0174, filed Mar. 13, 2014, the contents of which are incorporated herein by reference in their entirety.

FIELD OF THE INVENTION

The present invention relates to methods for extracting and purifying proteins. In particular, the present invention relates to extraction of pea protein. The invention further relates to pea proteins obtainable by the above methods, as well as food or feed products containing such pea proteins. The invention also relates to the use of such pea proteins in food or feed industry.

BACKGROUND OF THE INVENTION

Protein isolates from plant origin represent a valuable alternative or supplement to animal proteins in foods or feeds. For instance in foods, addition of plant proteins can effectively replace animal proteins, often at lower cost. In addition, many products traditionally containing animal proteins, in particular dairy products, may be a major cause of food allergies.

Leguminosae are notable in that most of them have symbiotic nitrogen-fixing bacteria in structures called root nodules. This arrangement means that the root nodules are sources of nitrogen for leguminosae, making them relatively rich in plant proteins. All proteins contain nitrogenous amino acids. Nitrogen is therefore a necessary ingredient in the production of proteins. Hence, leguminosae are among the best sources of plant protein. As leguminosae, such as peas (*Pisum sativum*), besides having a high protein content, are readily available and have a particularly well balanced amino acid composition, these represent a protein source which is a valuable alternative for animal proteins.

Major challenges in providing plant proteins revolve around protein composition and purity, and include aspects relating to for instance extraction, fractionation, and pre- and post-isolation treatments. By the time the plant protein is isolated and available in a more or less pure form, all prior manipulations have a large impact on the quality of the isolated plant protein. For instance, the type and quantity of impurities in protein isolates or extracts determine its final value. Such impurities include for instance carbohydrates. For instance leguminosae contain a significant portion of so-called flatulent sugars (e.g. raffinose, stachyose, and verbascose), which are particularly undesirable. While in general carbohydrates are unwanted impurities in the final protein isolate, some other impurities, such as vitamins or minerals may not per definition be undesirable, or may even be beneficial for nutritional and/or physicochemical aspects of the protein isolate. In addition to impacting on the final composition of the protein isolates or extracts, the extraction and/or purification process may dramatically impact on the physicochemical or functional properties of the protein isolate. In particular protein solubility, viscosity, emulsifying capacity, color, taste, or smell are heavily influenced by the used techniques.

As can be appreciated from the above, obtaining a high quality protein isolate having specific desired properties can be cumbersome, and often involves multiple expensive and/or time consuming manipulations. In view hereof, there is still a need to improve protein isolation from plants, in particular leguminosae, such as pea.

It is accordingly one of the objects of the present invention to overcome or ameliorate at least one of the disadvantages of the prior art, or to provide a useful alternative.

SUMMARY OF THE INVENTION

According to a first aspect of the present invention, a method for extracting pea proteins is provided. The method for extracting pea proteins comprises the steps of:
(a) subjecting an aqueous composition comprising peas to fermentation, preferably in the presence of lactic acid bacteria;
(b) milling said peas;
(c) fractionating said milled peas so as to obtain at least one protein comprising fraction; and
(d) isolating pea proteins from said at least one protein comprising fraction.

According to the present invention, pea protein extraction involves fermentation of peas prior to milling the peas. During or after milling, pea proteins are separated and isolated. Downstream purification steps are also envisaged.

According to a second aspect of the present invention, pea proteins are provided which are obtainable or obtained by the method according to the first aspect of the invention.

According to a third aspect of the present invention, an edible composition is provided, preferably a food or feed product, comprising the pea proteins according to the second aspect of the invention, or pea proteins obtained by the method according to the first aspect of the invention.

In a fourth aspect, the present invention provides the use of pea proteins according to the second aspect of the invention, or pea proteins obtained by the method according to the first aspect of the invention in food or feed products, preferably, in dairy products, confectionary products, beverages, meat products, vegetarian products, food supplements, nutritional products destined to weight control, sports, medical food and food for elderly, and in bakery food products.

The present inventors have surprisingly found that fermentation of peas (*Pisum sativum*), preferably with or in the presence of lactic acid bacteria beneficially affects several physicochemical and quality associated parameters of protein extracts, concentrates, or isolates derived therefrom.

When whole peas are subjected to fermentation prior to milling, advantageously removal of the fermenting microorganisms, as well as fermentation by-products, such as lactic acid, but also secreted compounds such as enzymes, which may affect downstream processing, are easily and in a cost-effective manner separated from the peas after fermentation. Moreover, unexpectedly, when fermenting whole peas the mono-, di-, and/or oligosaccharides content of the peas, and in particular the mono- and dimeric sugars, such as glucose, fructose, saccharose, galactose, and/or the flatulent sugars, such as raffinose, stachyose, and verbascose, all of which are inside the peas are drastically reduced, which is even more surprising when taking into account the limited duration of the fermentation in some embodiments. Without wishing to be bound to theory, it is believed that fermentation, in addition to sugar consumption, accelerates sugar diffusion out of the peas. Advantageously having reduced amounts of mono-, di- and oligosaccharides, allows to minimize the amount of for instance water and energy consumption in downstream processes, such as further purification. This provides therefore an economical advantage.

Furthermore, it has advantageously been found that fermentation until a specific level of hydration is reached, and/or until a specified pH in the peas is reached, as detailed below results in pea protein extracts, concentrates, and isolates with particular physicochemical and/or organoleptic characteristics having a beneficial effect on protein quality. For instance the color and viscosity of the final protein extract are beneficially affected by the method as described herein. In particular, viscosity of purified pea protein extracts is lowered if the fermentation step as described herein according to the invention is implemented, compared to protein extracts which have not been prepared according to the methods as described herein. In addition, the concentration of certain minerals in said extracts (such as potassium, and magnesium, the concentration of each of which is lowered in protein extracts prepared according to the methods according to the invention compared to protein extracts which have not been prepared according to the methods as described herein) is beneficially affected by the methods as described herein. Also, it has been found that the protein extracts prepared from peas which have been fermented according to the methods of the invention as described herein have a less bitter and astringent taste compared to protein extracts which have not been prepared according to the methods as described herein.

Furthermore, the presence of bacteria such as lactic acid bacteria, during hydration of the peas limits the development of spoilage micro-organisms (due to the bacteriostatic effect of lactic acid).

Another major advantage of performing fermentation of the peas prior to milling is that after fermentation, the fermentation products, as well as the fermenting micro-organisms can be easily removed and separated from the whole peas.

It has further advantageously and unexpectedly been found that protein extraction and purification associated process characteristics are affected by the method as described herein. It has for instance been found that the pH drops, and in particular the final pH in the peas, after fermentation as defined below reduces undesirable pressure build-up in downstream equipment (with associated risks for equipment damage). Also, fouling of downstream heat exchangers which implement downstream heat treatment, is minimized, such that cleaning frequency is lowered.

The independent and dependent claims set out particular and preferred features of the invention. Features from the dependent claims may be combined with features of the independent or other dependent claims as appropriate. The appended claims are hereby also explicitly included by reference in the description.

DETAILED DESCRIPTION OF THE INVENTION

Figure 1:
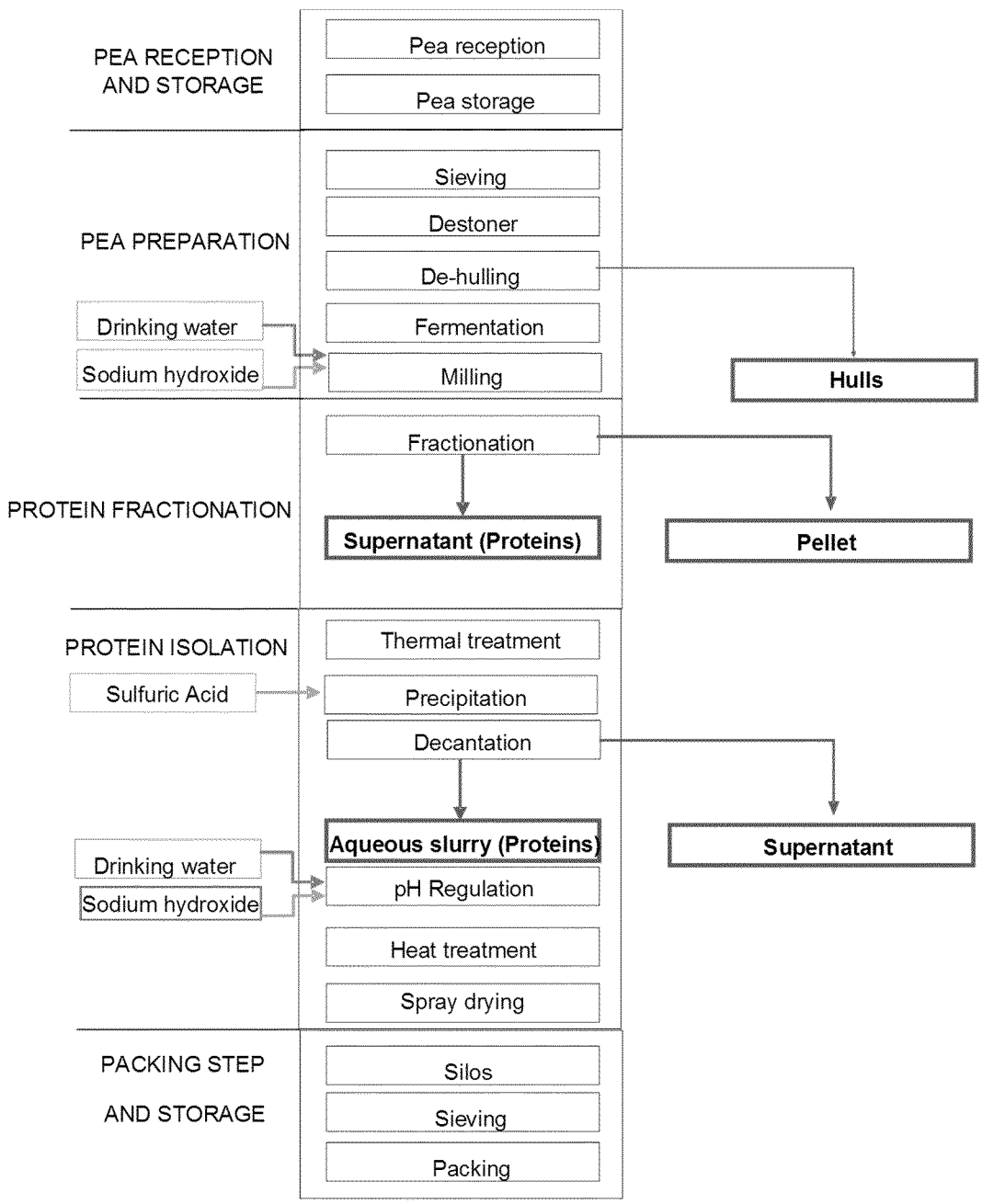
FIG. 1 schematically represents an extraction process according to an embodiment of the invention.

Before the present method of the invention is described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of", as well as the terms "consisting essentially of", "consists essentially" and "consists essentially of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−20% or less, preferably +/−10% or less, more preferably +/−5% or less, and still more preferably +/−1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the following detailed description of the invention, reference is made to the accompanying drawings that form a part hereof, and in which are shown by way of illustration only of specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Hereto, the present invention is in particular captured by any one or any combination of one or more of the below aspects and embodiments and numbered statements 1 to 54.

1. A method for extracting pea proteins, comprising the steps, preferably in the following order, of:
    (a) subjecting an aqueous composition comprising peas to fermentation;
    (b) milling said peas; thereby obtaining milled peas;
    (c) fractionating said milled peas so as to obtain at least one protein comprising fraction; and
    (d) isolating pea proteins from said at least one protein comprising fraction.
2. A method for extracting pea proteins, comprising the steps, preferably in the following order, of:
    (a) subjecting an aqueous composition comprising peas to fermentation in the presence of lactic acid bacteria;
    (b) milling said peas; thereby obtaining milled peas;
    (c) fractionating said milled peas so as to obtain at least one protein comprising fraction; and
    (d) isolating pea proteins from said at least one protein comprising fraction.
3. The method according to statement 1 or 2, wherein said peas in step (a) are subjected to fermentation until the pH in said peas is at most 5.5, preferably at most 5.0, more preferably ranging from pH 3.5 to pH 5, as measured at room temperature on 1 g of said peas which have been milled and then suspended in 9 g of water.
4. The method according to any one of statements 1 to 3, wherein said peas in step (a) are subjected to fermentation until the pH in said peas is reduced by at least 1 pH unit, preferably by at least 1.5 pH unit, as measured at room temperature on 1 g of said peas which have been milled and then suspended in 9 g of water.
5. The method according to any one of statements 1 to 4, wherein step (a) comprises adding dry peas and/or dehulled peas to an aqueous solution, preferably adding dry peas having a dry matter content ranging from 80% to 95% based on the total weight of the dry peas.
6. The method according to any one of statements 1 to 5, wherein step (a) comprises fermenting said peas until they have a dry matter content ranging from 35% to 60% based on the total weight of the peas.
7. The method according to any one of statements 1 to 6, wherein said peas after step (a) and before step (b) have a dry matter content ranging from 35% to 60% based on the total weight of the peas.
8. The method according to any one of statements 1 to 7, wherein said peas in step (a) are subjected to fermentation for at least 3 h, preferably for at least 3 h and at most 24 h.
9. The method according to any one of statements 1 to 8, wherein said peas in step (a) are subjected to fermentation at a temperature ranging from 30° C. to 50° C., preferably ranging from 35° C. to 45° C.
10. The method according to any one of statements 1 to 9, wherein step (a) comprises fermenting said peas in the presence of one or more *Lactobacillus* sp.
11. The method according to any one of statements 1 to 10, wherein said peas in step (a) are subjected to fermentation in the presence of at least $10^2$ cfu to $10^{10}$ cfu of lactic acid bacteria per ml of said aqueous composition comprising peas.
12. The method according to any one of statements 1 to 11, wherein fractionating said milled peas in step (c) comprises separating at least part of the proteins comprised in the peas from the rest of the pea, preferably in a fraction comprising at least 50 wt % of protein based on the total dry matter of said fraction.
13. The method according to any one of statements 1 to 12, wherein fractionating said milled peas in step (c) comprises adjusting the pH of the milled peas to a pH of at least 6, preferably at least 7, most preferably a pH of at least 8 and of at most 9. This pH adjustment can be performed using any suitable base, such as sodium hydroxide, potassium hydroxide, calcium hydroxide. Preferably, this pH adjustment is performed on an aqueous composition comprising milled peas having a dry matter of at most 45%, preferably at most 40%, preferably at most 35%, preferably at most 30%, preferably at most 25%. In an embodiment, the dry matter content of the milled peas is adjusted to the above cited dry matter content by addition of water accordingly.

14. The method according to any one of statements 1 to 13, wherein fractionating said milled peas in step (c) comprises subjecting said milled peas to one or more separation steps, preferably one or more decantation steps, preferably one or more centrifugal decantation steps.

15. The method according to any one of statements 1 to 14, wherein isolating pea proteins from said at least one protein comprising fraction of step (d), comprises concentrating said pea proteins.

16. The method according to any one of statements 1 to 15, wherein isolating pea proteins from said at least one protein comprising fraction in step (d), comprises at least one step selected from precipitation, flocculation, filtration, and/or chromatography.

17. Pea proteins obtainable by the method according to any of statements 1 to 16.

18. An edible composition, preferably a food or feed product, comprising the pea proteins according to statement 17.

19. Use of pea proteins according to statement 17 in food or feed products, preferably, in dairy products, confectionary products, beverages, meat products, vegetarian products, food supplements, nutritional products destined to weight control, sports, medical food and food for elderly, and bakery food products.

20. The method according to any of statements 1 to 16, wherein step (a) comprises contacting dehulled peas with an aqueous solution.

21. The method according to any one of statements 1 to 16, or 20, wherein step (a) comprises contacting dry dehulled peas with an aqueous solution, preferably dry dehulled peas having a dry matter content ranging from 80% to 95% based on total weight of the dry dehulled pea.

22. The method according to any one of statements 1 to 16, 20, or 21, wherein step (a) comprises fermenting said peas until they have a dry matter content ranging from 40% to 60% based on the total weight of the peas.

23. The method according to any one of statements 1 to 16 or 20 to 22, wherein said peas after step (a) and before step (b) have a dry matter content ranging from 40% to 50% based on the total weight of the peas.

24. The method according to any one of statements 1 to 16, or 20 to 23, wherein before, during and/or after the milling step (b) an aqueous solution is added, preferably water, preferably such as to obtain an aqueous composition comprising the milled peas, said composition comprising from 15% to 35% dry matter based on the total weight of the composition, preferably comprising from 15% to 35%, preferably from 18% to 33%, for example from 20% to 30%, such as at least 20%, for example at least 21%, for example at least 22%, for example at least 23%, for example at least 24%, for example at least 25%, 26%, 27%, 28%, 29%, for example at most 30%, for example at most 35%.

25. The method according to any one of statements 1 to 16, or 20 to 24, wherein said peas in step (a) are subjected to fermentation for at most 24 h, for example for at most 20 h, for example for at most 18 h, for example for at most 12 h, for example for at most 10 h.

26. The method according to any one of statements 1 to 16, or 20 to 25, wherein at the end of step (a) said peas have an acidity ranging from 25 to 250 mEq OH⁻ per g of peas.

27. The method according to any one of statements 1 to 16, or 20 to 26, wherein at the end of step (a) said peas have a sugar content of at most 6.0 wt % based on the total dry matter of said peas, wherein sugar content is the total amount of glucose, fructose, saccharose, verbascose, raffinose, stachyose, and galactose; preferably at most 5.5%, for example at most 5.0%, for example at most 4.5% for example at most 4.0%.

28. The method according to any one of statements 1 to 16 or 24 to 27, wherein fractionating said milled peas so as to obtain at least one protein comprising fraction in step (c) comprises adjusting the pH of the aqueous composition comprising the milled peas to a pH of at least 6, preferably at least 7, preferably at least 8, most preferably a pH of at least 7.5 and of at most 9, preferably a pH of at least 7.5 and of at most 8.5. Preferably, this pH adjustment is performed on an aqueous composition comprising milled peas having a dry matter of at most 45%, preferably at most 40%, preferably at most 35%, preferably at most 30%, preferably at most 25%. In an embodiment, the dry matter content of the milled peas is adjusted to the above cited dry matter content by addition of water accordingly.

29. The method according to any one of statements 1 to 16, or 20 to 28, wherein said at least one protein comprising fraction is subjected to a temperature of at least 30° C., for example of at least 40° C., for example of at least 50° C., for example of at least 55° C., for example of at most 80° C., for example of at least 50° C. and at most 80° C., for example of at least 53° C. and at most 78° C., for example of at least 54° C. and at most 75° C.

30. The method according to any one of statements 1 to 16, or 20 to 29, wherein said at least one protein comprising fraction is subjected to pasteurization.

31. The method according to any one of statements 1 to 16, or 20 to 30, wherein said aqueous composition comprising peas in step (a), comprises an aqueous solution, preferably water.

32. The method according to any one of statements 1 to 16, or 20 to 31, wherein the amount of peas in said aqueous composition comprising peas preferably ranges from 150 to 500 kg peas per m³ of aqueous composition comprising the peas.

33. The method according to any one of statements 1 to 16, or 20 to 32, wherein said aqueous composition comprising peas before or at the start of the fermentation of step (a) has a pH of at least 6, for example at least 6.2 for example at least 6.4, as measured on the aqueous composition comprising the peas, after said composition had been milled.

34. The method according to any one of statements 1 to 16, or 20 to 33, wherein said lactic acid bacteria are selected from the group comprising *Lactobacillus, Leuconostoc, Pediococcus, Streptococcus, Aerococcus, Camobacterium, Enterococcus, Oenococcus, Sporolactobacillus, Tetragenococcus, Vagococcus,* and *Weisella*, and combinations thereof.

35. The method according to any one of statements 1 to 16, or 20 to 34, wherein the lactic acid bacteria are *Lactobacillus* sp, most preferably selected from the group comprising *Lactobacillus fermentum, Lactobacillus crispatus, Lactobacillus panis, Lactobacillus mucosae, Lactobacillus pontis, Lactobacillus acidophilus, Lactobacillus plantarum, Lactobacillus helveticus, Lactobacillus buchneri, Lactobacillus delbrueckii* and *Lactobacillus casei* and mixtures thereof.

36. The method according to any one of statements 1 to 16, or 20 to 35, wherein the lactic acid bacteria are selected from the group comprising *Lactobacillus fermentum, Lactobacillus crispatus, Lactobacillus panis, Lactobacillus mucosae, Lactobacillus pontis*, and mixtures thereof.

37. The method according to any one of statements 1 to 16, or 20 to 36, wherein the lactic acid bacteria are selected from the group comprising *Lactobacillus fermentum, Lactobacillus crispatus, Lactobacillus panis, Lactobacillus mucosae, Lactobacillus pontis*, and mixtures thereof.

38. The method according to any one of statements 1 to 16, or 20 to 37, wherein said lactic acid bacteria is *Lactobacillus fermentum*, or *Lactobacillus crispatus*.

39. The method according to any one of statements 1 to 16, or 20 to 35, wherein said lactic acid bacteria is *Lactobacillus fermentum, Lactobacillus crispatus, Lactobacillus acidophilus*, or *Lactobacillus plantarum*.

40. The method according to any one of statements 1 to 16, or 20 to 35, wherein said lactic acid bacteria is *Lactobacillus fermentum, Lactobacillus crispatus*, or *Lactobacillus acidophilus*.

41. The method according to any one of statements 1 to 16, or 20 to 40, wherein said fermentation is anaerobic fermentation.

42. The method according to any one of statements 1 to 16, or 20 to 41, wherein the dry peas before the start of step (a) have a pH of at least 6.0, preferably a pH ranging from 6.0 to 7.0, such as for instance at least 6.0, for example at least 6.1, for example at least 6.2, for example at least 6.3, for example at most 6.9, for example at most 7.0, preferably ranging from 6.25 to 6.75 as measured at room temperature on 5 g of dry peas which have been milled with 95 g of water.

43. The method according to any one of statements 1 to 16, or 20 to 42, comprising the steps of:
    (a) subjecting an aqueous composition comprising peas to fermentation in the presence of lactic acid bacteria;
    (b) milling said peas in the presence of water; thereby obtaining an aqueous composition comprising milled peas;
    (c) fractionating said aqueous composition comprising milled peas so as to obtain at least one protein comprising fraction, preferably by adjusting the pH of said aqueous composition to a pH of at least 6; preferably, this pH adjustment is performed on the aqueous composition comprising milled peas having a dry matter of at most 45%, preferably at most 40%, preferably at most 35%, preferably at most 30%, preferably at most 25%. In an embodiment, the dry matter content of the aqueous composition is adjusted to the above cited dry matter content by addition of water accordingly;
    (d) isolating or concentrating pea proteins from said at least one protein comprising fraction.

44. The method according to any one of statements 1 to 16, or 20 to 43, wherein step (c) comprises fractionating said milled peas in a fraction comprising at least 50 wt % of protein based on the total dry matter of said fraction.

45. The method according to any one of statements 1 to 16, or 20 to 44, wherein isolating or concentrating pea proteins from said protein comprising fraction in step (d), comprises only one precipitation step.

46. The method according to any one of statements 1 to 16, or 20 to 45, wherein isolating or concentrating pea proteins from said protein comprising fraction in step (d) is performed by isoelectric precipitation.

47. The method according to any one of statements 1 to 16, or 20 to 45, wherein step (d) further comprises
    (e) obtaining said isolated or concentrated pea proteins as an aqueous slurry;
    (f) optionally subjecting said aqueous slurry to at least one heat treatment
    (g) optionally drying said aqueous slurry.

48. The method according to statement 47, wherein step (e) further comprises adjusting the pH of said aqueous slurry to a pH of at least 6.0, preferably the pH is adjusted to a pH of at least 6.5, preferably ranging from pH 6.0 to 8.5, preferably ranging from pH 6.5 to 8.5, preferably ranging from pH 7.0 to 8.5.

49. The method according to any one of statements 47 or 48, wherein step (f) comprises subjecting said aqueous slurry to a heat treatment for at least 0.01 second, preferably for a time ranging from 0.01 second to 20 minutes, preferably ranging from 10 seconds to 10 minutes.

50. The method according to any one of statements 47 to 49, wherein said heat treatment in step (f) is performed at a temperature of at least 70° C., preferably at a temperature ranging from 75° C. to 210° C., preferably ranging from 85° C. to 160° C., for example from 90° C. to 150° C.

51. The method according to any one of statements 47 to 50, wherein said heat treatment in step (f) is performed at a temperature ranging from 115° C. to 210° C. for a time ranging from 15 s to 0.01 s; at a temperature ranging from 95° C. to 115° C. for a time ranging from 5 min to 15 s; at a temperature ranging from 75° C. to 95° C. for a time ranging from 15 min to 5 min; at a temperature ranging from 75° C. to 110° C. for a time ranging from 10 min to 2 min; at a temperature ranging from 80° C. to 100° C. for a time ranging from 8 min to 5 min; or at a temperature ranging from 130° C. to 150° C. for a time ranging from 8 s to 1 s.

52. The method according to any one of statements 47 to 51, wherein the time of the heat treatment in step (f) decreases when the temperature of the heat treatment increases.

53. The method according to any one of statements 1 to 16, or 20 to 52, wherein before step (a) said dry peas have a sugar content of at least 6.2 wt % based on the total dry matter of said peas, wherein sugar content is the total amount of glucose, fructose, saccharose, verbascose, raffinose, stachyose, and galactose.

54. The method according to any one of statements 1 to 16, or 20 to 53, wherein step (d) comprises isolating said pea proteins as an extract comprising at least 60 wt %, preferably at least 70 wt %, more preferably at least 80 wt %, for example at least 85 wt % of protein based on the total dry matter of said extract.

In a first aspect, the invention relates to a method for extracting pea proteins, comprising the steps of:
(a) subjecting an aqueous composition comprising peas to fermentation, preferably in the presence of lactic acid bacteria;
(b) milling said peas;
(c) fractionating said milled peas so as to obtain at least one protein comprising fraction;
(d) isolating pea proteins from said at least one protein comprising fraction.

As used herein, the term "pea" refers to the round seeds contained in the pod of *Pisum sativum* and its subspecies, varieties or cultivars. Preferably, the peas are yellow peas, preferably dry yellow peas, i.e. yellow peas which have been harvested in a dry state. "Pea proteins" as used herein therefore refers to the proteins contained in the pea seeds.

According to the invention, the peas may be whole peas, i.e. peas as they are present in the pod. In a preferred embodiment however, the peas are dehulled peas, i.e. peas from which the hull is removed. Dehulled peas are peas from which the outer seed coating is removed. Removing of the hull can be performed by techniques known in the art, such as for instance mechanically with dehullers. It is to be understood that when referring herein to dehulled peas, in some embodiments, not all but nevertheless the vast majority of individual peas are dehulled, such as preferably more than 90% of the peas are dehulled.

Peas as used herein may be sorted prior to subjecting to fermentation. For instance stones or larger plant material, but also damaged peas, may be removed from the peas to be used according to the invention.

As used herein, "extracting pea proteins" refers to liberating and separating pea proteins from other constituents of peas. Extraction of pea proteins according to certain embodiments of the invention may encompass isolation or purification of pea proteins. The skilled person will understand that pea protein extracts do not entirely consist of proteins, and that a certain amount of additional components (impurities) may be present in pea protein extracts, such as lipids, carbohydrates, sugars, minerals, etc.

As used herein, the term "sugar" or "free sugar" refers to mono-, di-, and/or oligosaccharides consisting of up to 10 monomer units. In some embodiments, when referring to "total sugars" or "total free sugars", such encompasses the total of mono-, di-, and/or oligosaccharides consisting of up to 10 monomer units. In other embodiments, a specific subset of sugars is specified.

In some embodiments of the invention, pea protein extracts comprise based on dry matter at least 50 wt % proteins (i.e. 50 g of proteins per 100 g total dry matter), preferably at least 75 wt % proteins. In some embodiments, pea protein extracts comprise based on dry matter at least 50 wt % to at most 95 wt % or 99 wt % proteins, such as at least 75 wt % to at most 99 wt % proteins. Raw extracts typically comprise a lower fraction of protein than refined or purified extracts.

According to the invention, steps (a) to (d) of the method as specified above are preferably performed in the following order, i.e. step (a) precedes step (b), which in its turn precedes step (c), which in its turn precedes step (d). However, it is also possible according to the invention that steps (b) and (c) are performed simultaneously, i.e. that the milling step and fractionation step are performed simultaneously.

In step (a) of the method as described herein, an aqueous composition comprising peas is subjected to fermentation, preferably in the presence of lactic acid bacteria. According to the invention, the peas which are fermented in step (a) are unmilled peas (i.e. whole peas). The peas may however in an embodiment be split peas. In an embodiment, the peas are round when harvested and dry. After the hull is removed, the natural split in the seed's cotyledon can be manually or mechanically separated, resulting in "split peas".

As used herein, the term "aqueous composition comprising peas" used in step (a) refers to a composition mainly comprising or exclusively consisting of an aqueous solution such as water, apart from the peas. In some embodiments, the aqueous composition for instance comprises a suspension of peas in an aqueous solution. In a preferred embodiment, the aqueous solution is water. In an embodiment, the water can be tap water, or well water which has been treated so as to render it drinkable. The water used is preferably drinking water, i.e. water suitable for human consumption.

In some embodiments, the amount of peas which is added to the aqueous solution to reconstitute the aqueous composition comprising peas preferably ranges from 150 to 500 kg peas per $m^3$ of aqueous composition comprising the peas, i.e. per 150 to 500 kg peas an aqueous solution is added until a final volume of 1 $m^3$ is reached.

In an embodiment, the aqueous composition comprising the peas at the beginning of step (a) of the herein described method, preferably at the start of fermentation, has a pH of at least 6, preferably at least 6.2, for example at least 6.4, as measured on the aqueous composition comprising the peas, after said composition had been milled.

In a preferred embodiment, the peas which are contacted with the aqueous composition are naturally harvested dry, or in an embodiment the peas can be fresh peas. Preferably the peas are dry peas, and have a dry matter content (on weight basis) of at least 80% (i.e. at least 80 g of dry matter per 100 g of total weight of the dry peas), more preferably of at least 85%, for example of at least 90%, for example of at least 95%, such as for instance ranging from 80% to 95%, for example from 85% to 95%, for example from 90% to 95%.

As used herein, the term "fermentation" has its ordinary meaning in the art. By means of further guidance, fermentation is a microbiological metabolic process comprising conversion of sugar to acids, and/or gases using yeast and/or bacteria. Subjecting an aqueous composition comprising peas to fermentation as used herein therefore may refer to incubating the aqueous composition comprising peas with bacteria and/or yeast, preferably lactic acid bacteria, under conditions suitable for the bacteria and/or yeast to be metabolically active.

As used herein, "lactic acid bacteria" refers to a population of Gram-positive, low-GC, acid-tolerant, generally non-sporulating, non-respiring rod or cocci that are associated by their common metabolic and physiological characteristics, and produce lactic acid as the major metabolic end-product of carbohydrate fermentation. These bacteria, can be usually found in decomposing plants and lactic products. As used herein, lactic acid bacteria may be non-pathogenic in the sense that they do not cause harm or does not lead to deleterious effects when ingested. Preferably, the lactic acid bacteria as used herein are one or more bacterial genera selected from *Lactobacillus, Pediococcus, Lactococcus, Leuconostoc, Streptococcus, Aerococcus, Carnobacterium, Enterococcus, Oenococcus, Sporolactobacillus, Tetragenococcus, Vagococcus,* and *Weisella*, and combinations thereof. Most preferably, the lactic acid bacteria are *Lactobacillus* sp, most preferably selected from the group consisting of *Lactobacillus fermentum, Lactobacillus crispatus, Lactobacillus panis, Lactobacillus mucosae, Lactobacillus pontis, Lactobacillus acidophilus, Lactobacillus plantarum, Lactobacillus helveticus, Lactobacillus buchneri, Lactobacillus delbrueckii,* and *Lactobacillus casei,* and mixtures thereof, for example from the group consisting of *Lactobacillus fermentum, Lactobacillus crispatus, Lactobacillus panis, Lactobacillus mucosae, Lactobacillus pontis, Lactobacillus acidophilus* and mixtures thereof, for example from the group consisting of *Lactobacillus fermentum, Lactobacillus crispatus, Lactobacillus panis, Lactobacillus mucosae, Lactobacillus pontis*, and mixtures thereof, for example said bacteria is *Lactobacillus fermentum*, or *Lactobacillus crispatus*. In some embodiments, fermentation may be spontaneous fermentation (i.e. in which no fermenting microorganisms are deliberately added, but fermentation is effected by microorganisms, preferably lactic acid bacteria, which naturally occur on/in peas and/or in the environment) or may be inoculated fermentation (i.e. in which fermenting microorganisms, preferably lactic acid bacteria, are deliberately added). Fermentation may also be effected by transferring part or all of the aqueous fraction of one fermentation step to a next fermentation which is to be started up, for example by transferring at least 1/10th of the first fermentation volume to at least one second fermentation step. In a preferred embodiment, the fermentation is anaerobic fermentation. In a preferred embodiment, said *Lactobacillus fermentum* is *Lactobacillus fermentum* LMG 6902 or LMG 18026. In a preferred embodiment, said *Lactobacillus Crispatus* is *Lactobacillus Crispatus* LMG 12005. In a preferred embodiment, said *Lactobacillus Acidophilus* is *Lactobacillus Acidophilus* LMG 8151.

In an embodiment, the aqueous composition comprising peas is subjected to fermentation in step (a) of the above described method until the pH in the peas is at most 5.5, preferably at most 5.0, more preferably ranging from 3.5 to 5, preferably, as measured at room temperature on 1 g of said peas which have been milled and then suspended in 9 g of water, as described in the experimental section. In an embodiment, the aqueous composition comprising peas is subjected to fermentation in step (a) of the above described method until the pH in the peas ranges from 3.5 to 4.5, for example from 4.0 to 5.0, preferably from 4.5 to 5.5, such as for instance at least 3.5, for example at least 3.75, for example at least 4.0, for example at least 4.25, for example at least 4.50, for example at least 4.75, for example at most 5.0, for example at most 5.25, for example at most 5.5, preferably, as measured at room temperature on 1 g of said peas which have been milled and then suspended in 9 g of water, as described in the experimental section.

In an embodiment, the dry peas have a pH of at least 6.0, preferably ranging from 6.0 to 7.10 before fermentation in step (a) of the above described method, such as for instance at least 6.0, for example at least 6.1, for example at least 6.2, for example at least 6.3, for example 6.4, for example 6.5, for example 6.6, for example 6.7, for example 6.8, for example 6.9, for example 7.10, preferably ranging from 6.25 to 6.75, preferably as measured at room temperature on 5 g of dry peas which have been milled with 95 g of water.

In an embodiment, the aqueous composition comprising peas is subjected to fermentation in step (a) of the above described method until the pH in the peas lowers by at least 1 pH unit, preferably by at least 1.5 pH unit, such as for instance at least 1, for example at least 1.1, for example at least 1.2, for example at least 1.3, for example at least 1.4, for example at least 1.5, for example at least 1.6, for example at least 1.7, for example at least 1.8, for example at least 1.9, for example at least 2, for example at least 2.1, for example at least 2.2, for example at least 2.3, for example at least 2.4, for example at least 2.5, for example at least 2.6, for example at least 2.7, for example at least 2.8, for example at least 2.9, for example at least 3 pH unit, preferably, as measured at room temperature on 1 g of said peas which have been milled and then suspended in 9 g of water. In another embodiment, the aqueous composition comprising peas is subjected to fermentation in step (a) of the above described method until the pH in the peas lowers by 1 pH unit to 3 pH units, preferably by 1.5 pH units to 3 pH units, such as for instance by 1.5 pH units to 2.5 pH units, for example by 2.0 pH units to 3.0 pH units, preferably, as measured at room temperature on 1 g of said peas which have been milled and then suspended in 9 g of water. By means of example, and without limitation, at the start of fermentation, the pH in the peas may be 6.5, and at the end of fermentation, the pH in the peas may be 5.0, preferably, as measured at room temperature on 1 g of said peas which have been milled and then suspended in 9 g of water, as described in the experimental section.

In an embodiment, the aqueous composition comprising peas is subjected to fermentation in step (a) of the above described method for a duration of at least 3 h, preferably at least 4 h, more preferably at least 6 h. In another embodiment, the aqueous composition comprising peas is subjected to fermentation in step (a) of the above described method for a duration ranging from 3 h to 24 h, preferably ranging from 4 h to 24 h, more preferably ranging from 4 h to 20 h, such as for instance at least 3 h, for example at least 4 h, for example at least 5 h, for example at least 6 h, for example at least 7 h, for example at least 8 h, at least 9 h, about 10 h, about 11 h, about 12 h, about 13 h, about 14 h, for example at most 15 h, for example at most 16 h, for example at most 17 h, for example at most 18 h, for example at most 19 h, for example at most 20 h, for example at most 21 h, for example at most 22 h, for example at most 23 h, for example at most 24 h. The skilled person will appreciate that for instance spontaneous fermentations may take longer than fermentations which are effected by addition of bacteria, in view of the different amounts of microorganisms at the start of the fermentation.

In an embodiment, the aqueous composition comprising peas are subjected to fermentation in step (a) of the above described method at a temperature which is optimal for the fermenting microorganism, preferably at a temperature which is maximally 5° C. higher or lower than the temperature which is optimal for the fermenting microorganism. Optimal temperatures for the bacteria and/or yeasts as defined herein are known in the art. By means of further guidance, and without limitation, an optimal temperature as defined herein refers to the temperature at which growth is maximized. In a further embodiment, the aqueous composition comprising peas is subjected to fermentation in step (a) of the above described method at a temperature of at least 30° C., for example ranging from 30° C. to 50° C., preferably ranging from 35° C. to 45° C. In another embodiment, the aqueous composition comprising peas is subjected to fermentation in step (a) of the above described method at a temperature ranging from 30° C. to 40° C., from 35° C. to 45° C., or from 40° C. to 50° C., preferably 40° C., or about 40° C.

In an embodiment, the aqueous composition comprising peas is subjected to fermentation in step (a) of the above described method in the presence of fermenting microorganisms, such as bacteria and/or yeast, preferably comprising one or more lactic acid bacteria, wherein preferably said fermenting lactic acid bacteria are selected from the group comprising one or more *Lactobacillus* sp. In an embodiment, the fermentation is performed in the presence of one or more of the above specified microorganisms, preferably lactic acid bacteria, at a concentration ranging from $10^2$ cfu/ml to $10^{10}$ cfu/ml of said aqueous composition comprising the peas, such as at least $10^2$ cfu/ml, for example at least $10^5$ cfu/ml, for example at least $10^6$ cfu/ml, for example at least $10^7$ cfu/ml, for example at least $10^8$ cfu/ml, for example at least $10^9$ cfu/ml of said aqueous composition comprising the peas. "cfu" (colony forming units) are well known in the art and can for instance be determined by plate counting. It is to be understood that "cfu/ml" refers to the amount of cfu per ml of the total aqueous composition comprising peas, i.e. including the peas.

In another embodiment, the aqueous composition comprising the peas is subjected to fermentation in step (a) of the above described method in the presence of fermenting microorganisms, preferably comprising one or more lactic acid bacteria, preferably comprising one or more *Lactobacillus* sp., wherein the microorganisms, preferably lactic acid bacteria, are added at a concentration of at least $10^2$ cfu/ml of aqueous composition comprising peas.

In an embodiment, the peas after step (a) and before step (b) of the above described method, i.e. at the end of fermentation and before the milling step, have a dry matter content (on weight basis) ranging from 35% to 60%, preferably from 35% to 55%, for example from 40% to 50%, such as for instance at least 40%, for example at least 41%, at least 42%, for example at least 43%, for example at least 44%, for example at least 45%, for example at least 46%, for example at least 47%, about 48%, about 49%, for example at most 50%, for example at most 55%, for example at most 60% based on the total weight of the peas at the end of the fermentation, i.e. after the peas have been isolated from the aqueous composition.

In a further embodiment, the peas in step (a) of the above described method are fermented until they have a dry matter content (on weight basis) ranging from 35% to 60%, preferably from 35% to 55%, for example from 40% to 50%, such as for instance at least 40%, for example at least 41%, at least 42%, for example at least 43%, for example at least 44%, for example at least 45%, for example at least 46%, for example at least 47%, about 48%, about 49%, for example at most 50%, for example at most 55%, for example at most 60% based on the total weight of the peas at the end of the fermentation, i.e. after the peas have been isolated from the aqueous composition. In this embodiment, the peas preferably have a dry matter content (on weight basis) before fermentation, or at the start of fermentation of at least 80% (i.e. at least 80 g of dry matter per 100 g of total weight of the dry peas), more preferably of at least 85%, for example of at least 90%, for example of at least 95%, such as for instance ranging from 80% to 95%, for example from 85% to 95%, for example from 90% to 95%.

In step (b) of the method according to the invention as described above, the peas which have been subjected to fermentation in step (a) are milled. To this effect, in an embodiment, the peas are removed from the aqueous composition after step (a) and then subjected to milling. Preferably, the peas are washed or rinsed after step (a) and before step (b). Washing or rinsing may be performed with an aqueous solution, preferably water, such as tap water, or treated well water, preferably drinking water, i.e. water suitable for human consumption.

As used herein, the term "milling" has its ordinary meaning in the art. By means of further guidance, milling, as used herein may refer to the process of grinding of solid matters, i.e. peas, under exposure of mechanical forces that trench the structure by overcoming of the interior bonding forces. Milling may thus disintegrate the native structure of the peas. In a preferred embodiment, the milled particle size of a milled pea comprising at least 25% dry matter have a D50 of at most 300 μm, preferably of at most 250 μm, for example at most 200 μm, with D50 being defined as the particle size for which fifty percent by volume of the particles have a size lower than the D50; and D50 being measured by laser diffraction analysis on a Malvern type analyzer.

For example, the D50 can be measured by sieving or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after the peas have been milled and are in a water suspension having a 25% dry matter. Suitable Malvern systems include the Malvern 2000, Malvern MasterSizer 2000 (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

In an embodiment, prior to, during, or after milling the peas in step (b) of the method according to the invention as described above, an aqueous solution, preferably water, such as tap water, or treated well water, preferably drinking water, i.e. water suitable for human consumption, is added to the peas. In a further embodiment, an amount of aqueous solution is added to the peas such as to obtain an aqueous composition comprising the milled peas, preferably wherein said composition comprises from 15% to 35% dry matter based on the total weight of the composition, preferably comprising from 15% to 35%, preferably from 20% to 30%, such as at least 19%, such as at least 20%, such as at least 21%, such as at least 22%, for example at least 23%, for example at least 24%, for example at least 25%, for example at least 26%, for example at least 27%, for example at least 28%, for example at least 29%, for example at most 30%, for example at most 35% dry matter based on the total weight of the composition. In a preferred embodiment, the milling process is a wet milling process, such that an aqueous solution is added to the peas prior to or during milling.

In an embodiment, step (c) of the method according to the invention as described above, comprises fractionating said milled peas in a fraction comprising at least 50 wt % of protein based on the total dry matter of said fraction. Accordingly, in an embodiment, step (c) of the method according to the invention as described above comprises separating at least part of the proteins comprised in the peas from the rest of the pea, preferably in a fraction comprising at least 50 wt % of protein based on the total dry matter of said fraction. As used herein, the term "fractionating" refers to a process by which at least part of the proteins comprised in the peas are separated from the rest of the pea. It is to be understood that when referring to the fractionation step, in some embodiments not all, but nevertheless the majority of individual proteins are separated, such as preferably at least 50 wt %, preferably at least 60 wt % of the proteins, based on the total protein content of the milled peas, are separated.

Fractionation of the milled peas into a protein comprising fraction may be achieved by any means known in the art such as adding a suitable base, or a salt.

Preferably, the milled peas are fractionated by increasing the pH of the milled peas. Preferably fractionation step (c) comprises adjusting the pH of the milled peas to a pH of at least 6, preferably at least 7, most preferably a pH of at least 8 and at most 9. Preferably fractionation step (c) comprises increasing the pH of an aqueous composition comprising the milled peas. In a preferred embodiment, the pH of the composition is adjusted to a pH of at least 6, more preferably at least 7. In another preferred embodiment, the pH of the composition is adjusted to a value ranging from pH 6 to pH 9, more preferably from pH 7 to pH 9, such as at least 7.0, for example at least 7.1, for example at least 7.2, for example at least 7.3, for example at least 7.4, for example at least 7.5, for example at least 7.6, for example at least 7.7, for example at least 7.8, for example at least 7.9, for example at least 8.0, for example at least 8.1, for example at least 8.2, for example at least 8.3, for example at least 8.4, for example at most 8.5, for example at most 8.6, for example at most 8.7, for example at most 8.8, for example at most 8.9, for example at most 9.0, most preferably ranging from pH 7.5 to pH 8.5, most preferably pH 8 or about pH 8. Preferably, this pH adjustment is performed on an aqueous composition comprising milled peas having a dry matter of at most 45%, preferably at most 40%, preferably at most 35%, preferably at most 30%, preferably at most 25%. In an embodiment, the dry matter content of the milled peas is adjusted to the above cited dry matter content by addition of water accordingly. This pH adjustment can be performed using any suitable base, such as sodium hydroxide, calcium hydroxide, potassium hydroxide and the like. In a preferred embodiment, the pH of the milled pea containing compositions is adjusted by addition of sodium hydroxide.

In a preferred embodiment, after adjustment of the pH the protein comprising fraction is separated from the aqueous composition comprising milled peas, by decantation or by the use of a hydrocyclone, preferably by decantation, preferably centrifugal decantation (i.e. by means of a decanting centrifuge), wherein the protein comprising fraction is the supernatant, and the pellet is a fraction comprising among others the rest of the content of the milled peas and some residual proteins. In an embodiment, more than one fractionation step may be performed sequentially. For instance, after decantation, the pellet may be suspended in an aqueous solution (preferably in an aqueous solution, preferably having a pH similar or higher (preferably pH 8.5 or about pH 8.5) than in the first fractionation step) and subjected to a decantation step, such as to retrieve additional proteins in the supernatant.

As indicated elsewhere, step (c) and step (b) of the method according to the invention may be performed simultaneously or in the alternative, step (c) may be performed subsequently to step (b).

It is to be understood that the protein comprising fraction may also comprise further constituents, notably those which are rendered soluble by or remain soluble by the fractionation step.

In an embodiment, the protein comprising fraction comprises at least 1.0% dry matter based on the total weight of the composition, preferably at least 2.0% dry matter, more preferably at least 3.0% dry matter, such as for instance at least 4.0% dry matter, such as for instance at least 5.0% dry matter.

In another embodiment, the protein comprising fraction comprises from 1.0% to 40% dry matter, preferably from 2.0% to 30% dry matter, more preferably from 3.0% to 20% dry matter, more preferably from 3.0% to 15% dry matter, such as from 3.0% to 10%.

In an embodiment, the dry matter of the protein comprising fraction comprises at least 50 wt % pea proteins, preferably at least 60 wt % pea proteins, more preferably at least 65 wt % pea proteins, such as for instance at least 70 wt %, such as from at least 55 wt % and at most 80 wt %, or between 60 wt % and 80 wt %, or between 60 wt % and 78 wt %.

In some embodiments, in one additional step, the protein comprising fraction is subjected to at least one heat treatment, preferably said protein comprising fraction is subjected to a temperature of at least 30° C., for example at least 40° C., for example at least 50° C., for example said protein comprising fraction is subjected to a temperature ranging from 30° C. to 90° C., more preferably ranging from 50° C. to 80° C., even more preferably ranging from 55° C. to 75° C., such as for instance 55° C., 60° C., 65° C., 70° C., or 75° C. In an embodiment, the heat treatment is from 50° C. to 60° C., for example from 55° C. to 65° C., for example from 60° C. to 70° C., for example from 65° C. to 75° C., or for example from 70° C. to 80° C. The skilled person will understand that such heat treatment may be pasteurization. Pasteurization is well known in the art and may comprise a heat treatment at a specific temperature or temperature range for a specific time or time range. The skilled person will understand that generally, when the temperature of the heat treatment, increases, the duration of the heat treatment decreases.

In step (d) of the method according to the invention as described above, pea proteins are isolated from said protein comprising fraction. As used herein, the term "isolated" or "isolating" may refer to a process which separates proteins from said protein comprising fraction. The term "concentration" can also be used interchangeably with "isolation". Accordingly, as used herein, in step (d) of the method according to the invention as described above, pea proteins are concentrated from said protein comprising fraction. Preferably said isolating or concentration step can be performed using precipitation, flocculation, filtration, and/or chromatography, or a combination thereof.

In an embodiment, step (d) of the method according to the invention as described above, comprises subsequent additional process steps to further purify the pea protein and/or to increase the yield. In essence, such additional steps can be used to remove impurities which are co-isolated with the isolated proteins.

One or more, preferably all, of the following steps below may be implemented to this effect.

In some embodiments, the proteins are isolated or concentrated from said aqueous composition comprising pea proteins using precipitation, flocculation, filtration, and/or chromatography. Preferably, the proteins are isolated or concentrated by means of isoelectric precipitation or by ultrafiltration. In a preferred embodiment, isolating or concentrating pea proteins from said protein comprising fraction in step (d), comprises at least one step of isoelectric precipitation of said proteins. In a preferred embodiment, isolating or concentrating pea proteins from said protein comprising fraction in step (d), comprises only one step of isoelectric precipitation of said proteins.

Preferably, the pH of the protein comprising fraction is adjusted to the isoelectric point of the proteins. As used herein, the term "isoelectric point" refers to the pH at which proteins have a net ionic charge of 0, or substantially 0 (i.e. the sum of positive and negative charges is 0, or substantially 0). While it is appreciated that the isoelectric point of individual proteins may vary, as used herein, the isoelectric pH of the protein comprising fraction as used herein refers to the pH of the fraction at which the overall charge of the proteins in the fraction is 0, or substantially 0. The isoelectric pH of proteins and protein compositions can be determined by techniques known in the art. Herein the isoelectric pH is determined as the pH at which the Nitrogen Solubility Index is the lowest. In a preferred embodiment, the pH of the protein comprising fraction is adjusted in the range from 4.0 to 5.8, preferably from 4.5 to 5.5, preferably from 4.5 to 5.0, such as for instance 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8. The pH adjustment may be effected by addition of an acid, such as sulfuric acid, or hydrochloric acid. At the isoelectric point, most proteins precipitate or aggregate.

Separation of the precipitated or aggregated proteins may be effected by decantation, preferably centrifugal decantation. In a preferred embodiment, the dry matter content (on weight basis) after separation of the precipitated or aggregated proteins ranges from 20% to 40%, such as for instance at least 25%, for example at least 26%, for example at least 27%, for example at least 28%, for example at least 29%, 30%, 31%, 32%, 33%, 34%, or 35%, preferably at least 27% and at most 38% based on the total weight of the precipitated or aggregated proteins (also referred as the aqueous slurry). The dry matter content may be further adjusted, for instance by addition of an aqueous solution to the precipitated or aggregated proteins, thereby obtaining a composition of precipitated proteins. In an embodiment said aqueous solution is preferably water, preferably drinking water, i.e. water suitable for human consumption. Preferably the dry matter content can be adjusted to range from 10% to 25%, preferably from 15% to 20%, such as for instance at least 15%, for instance at least 16%, preferably at least 17%, 18%, 19%, 20% based on the total weight of the composition of precipitated proteins. Optionally, the step of concentrating the proteins can be repeated at least one more time. Preferably, the step of concentrating the proteins is performed only once.

In a preferred embodiment, the precipitated or aggregated proteins are resuspended preferably in an aqueous solution, preferably water, preferably drinking water, i.e. water suitable for human consumption. The dry matter content preferably ranges from 10% to 25%, preferably from 15% to 20%, such as for instance at least 15%, for example at least 16%, 17%, 18%, 19%, 20% of the resuspended proteins composition.

In one embodiment, the pH of the resuspended proteins composition is adjusted to a pH of at least 6.0, preferably the pH is adjusted to a pH of at least 6.5, preferably ranging from pH 6.0 to 8.5, preferably ranging from pH 6.5 to 8.5, preferably ranging from pH 7.0 to 8.5, preferably from pH 7.3 to 8.0, such as for instance at least pH 7.2, for example at least 7.3, 7.4, 7.5, 7.6, 7.7, 7.8, 7.9, 8.0. To this effect, for instance sodium hydroxide or any suitable base may be used to adjust the pH to the desired level. Preferably, this pH adjustment is performed on an aqueous composition comprising resuspended proteins having a dry matter of at most 45%, preferably at most 40%, preferably at most 35%, preferably at most 30%, preferably at most 25%. In an embodiment, the dry matter content of the aqueous composition comprising resuspended proteins is adjusted to the above cited dry matter content by addition of water accordingly.

In another embodiment, the pH of the resuspended proteins composition is adjusted to range from pH 4.0 to 5.8, preferably from pH 4.5 to 5.5, such as for instance pH 4.5, 4.6, 4.7, 4.8, 4.9, 5.0, 5.1, 5.2, 5.3, 5.4, 5.5. To this effect, for instance sodium hydroxide or sulfuric acid may be used to adjust the pH to the desired level. Preferably, this pH adjustment is performed on an aqueous composition comprising resuspended proteins having a dry matter of at most 45%, preferably at most 40%, preferably at most 35%, preferably at most 30%, preferably at most 25%. In an embodiment, the dry matter content of the aqueous composition comprising resuspended proteins is adjusted to the above cited dry matter content by addition of water accordingly.

Optionally, but preferably, the resuspended proteins composition having the set pH within the range as indicated above is further subjected to at least one heat treatment, preferably a heat treatment at a temperature of at least 70° C., preferably at least 75° C., more preferably at least 80° C., yet more preferably at least 85° C., yet more preferably at least 90° C., for example at least 95° C., preferably at most 160° C., yet more preferably at most 210° C. For a example said heat treatment can be ranging from 70° C. to 210° C., preferably ranging from 85° C. to 160° C., more preferably ranging from 90° C. to 150° C. The heat treatment may advantageously be effected by means of one or more heat exchangers or by direct or indirect injection of steam. In an embodiment, the duration of the heat treatment is of at least 0.01 second, preferably ranging from 0.01 second to 20 min, preferably ranging from 10 seconds to 10 minutes. The skilled person will appreciate that the higher the temperature, the shorter the duration of heat treatment. For instance, the heat treatment may be at a temperature ranging from 115° C. to 210° C. for a time ranging from 0.01 s to 15 s. Alternatively, for instance, the heat treatment may be at a temperature ranging from 95° C. to 115° C. for a time ranging from 15 s to 5 min. Alternatively, for instance, the heat treatment may be at a temperature ranging from 70° C. to 95° C. for a time ranging from 5 min to 15 min. In a preferred embodiment, the heat treatment is performed at a temperature ranging from 95° C. to 110° C. for a time ranging from 2 min to 8 min. In another preferred embodiment, the heat treatment is performed at a temperature ranging from 130° C. to 140° C. for a time ranging from 1 s to 8 s. After the heat treatment, the protein comprising compositions may be maintained at a temperature ranging from 70° C. to 90° C., preferably ranging from 70° C. to 85° C., before drying.

In an optional, but preferable, embodiment, the resuspended proteins composition having the set pH within the range as indicated above is further subjected to at least one heat treatment at a temperature ranging from 115° C. to 210° C. for a time ranging from 15 s to 0.01 s; at a temperature ranging from 95° C. to 115° C. for a time ranging from 5 min to 15 s; at a temperature ranging from 75° C. to 95° C. for a time ranging from 15 min to 5 min; at a temperature ranging from 75° C. to 110° C. for a time ranging from 10 min to 2 min; at a temperature ranging from 80° C. to 100° C. for a time ranging from 8 min to 5 min; or at a temperature ranging from 130° C. to 150° C. for a time ranging from 8 s to 1 s. Preferably the time of the heat treatment decreases when the temperature of the heat treatment increases.

In a further additional step, the protein comprising compositions may be subjected to drying, whether or not previously subjected to heat treatment after isolation/concentration, or whether or not previously subjected to precipitation. Drying may be effected by any means in the art, such as by application of hot air, evaporation, freeze drying, contact drying, steam drying, dielectric drying, roller drying, flash drying, etc. In a preferred embodiment, the proteins are dried by spray drying. Optionally, the protein comprising compositions may be subjected to granulation, by techniques known in the art.

In a preferred embodiment, the present invention relates to a method for extracting pea proteins from *Pisum sativum* ssp., comprising the steps of:
(i) subjecting an aqueous composition comprising dry and dehulled peas to fermentation in the presence of one or more lactic acid bacteria, preferably one or more *Lactobacillus* sp until the pH in said peas is ranging from 3.5 to 5.5, as measured at room temperature on 1 g of said peas which have been milled and then suspended in 9 g of water, preferably wherein the pH in the dry peas before fermentation is at least 6.0, as measured at room temperature on 5 g of dry peas which have been milled with 95 g of water;
(ii) milling said peas;
(iii) fractionating said milled peas so as to obtain at least one protein comprising fraction, optionally simultaneously with step (ii), by adjusting the pH of the milled peas to a pH of at least 6.0, for example ranging from 6.0 to 9, preferably from 7 to 9; preferably, this pH adjustment is performed on an aqueous composition comprising milled peas having a dry matter of at most 45%, preferably at most 40%, preferably at most 35%, preferably at most 30%, preferably at most 25%; in an embodiment, the dry matter content of the milled peas is adjusted to the above cited dry matter content by addition of water accordingly;
(iv) isolating or concentrating pea proteins from said at least one protein comprising fraction.

In a preferred embodiment, the present invention relates to a method for extracting pea proteins from *Pisum sativum* ssp., comprising the steps of:
(i) subjecting an aqueous composition comprising dry and dehulled peas to fermentation in the presence of one or more lactic acid bacteria, wherein said dry dehulled peas have dry matter content of 80% to 95% based on total weight of the dry dehulled pea; preferably in the presence of at least one or more *Lactobacillus* sp until the pH in said peas is ranging from 3.5 to 5.5, as measured at room temperature on 1 g of said peas which have been milled and then suspended in 9 g of water, preferably wherein the pH in the peas before fermentation is from 6.0 to 7.0, as measured at room temperature on 5 g of dry peas which have been milled with 95 g of water;
(ii) milling said peas;
(iii) fractionating said milled peas so as to obtain at least one protein comprising fraction, optionally simultaneously with step (ii), by adjusting the pH of said milled peas to a pH of at least 6.0, for example ranging from 6.0 to 9.0, preferably from 7.0 to 9.0; preferably, this pH adjustment is performed on an aqueous composition comprising milled peas having a dry matter of at most 45%, preferably at most 40%, preferably at most 35%, preferably at most 30%, preferably at most 25%; in an embodiment, the dry matter content of the milled peas is adjusted to the above cited dry matter content by addition of water accordingly;
(iv) isolating or concentrating pea proteins from said at least one protein comprising fraction.

In a most preferred embodiment, the present invention relates to a method for extracting pea proteins from *Pisum sativum* ssp., comprising the steps of:
(i) subjecting an aqueous composition comprising dry and dehulled peas to fermentation in the presence of one or more lactic acid bacteria at a temperature ranging from 35° C. to 45° C. until the pH in said peas is ranging from 3.5 to 5.5, as measured at room temperature on 1 g of said peas which have been milled and then suspended in 9 g of water, wherein said dry dehulled peas have dry matter content of 80% to 95% based on total weight of the dry dehulled pea; preferably in the presence of one or more *Lactobacillus* sp; preferably wherein the pH in the peas before fermentation is from 6.0 to 7.0, as measured at room temperature on 5 g of dry peas which have been milled with 95 g of water, as measured on the aqueous composition comprising the peas, after said composition had been milled;
(ii) milling said peas;
(iii) fractionating said milled peas so as to obtain at least one protein comprising fraction, optionally simultaneously with step (ii), by adjusting the pH ranging of said milled peas to a pH of at least 6.0, for example ranging from 6.0 to 9, preferably from 7 to 9; preferably, this pH adjustment is performed on an aqueous composition comprising milled peas having a dry matter of at most 45%, preferably at most 40%, preferably at most 35%, preferably at most 30%, preferably at most 25%; in an embodiment, the dry matter content of the milled peas is adjusted to the above cited dry matter content by addition of water accordingly;
(iv) isolating or concentrating pea proteins from said at least one protein comprising fraction.

In a most preferred embodiment, the method for extracting pea proteins from *Pisum sativum* ssp., comprises the steps of:
(i) subjecting an aqueous composition comprising dry and dehulled peas to fermentation in the presence of one or more lactic acid bacteria at a temperature ranging from 35° C. to 45° C. until the pH in said peas is ranging from 3.5 to 5.5, as measured at room temperature on 1 g of said peas which have been milled and then suspended in 9 g of water, wherein said dry dehulled peas have dry matter content of 80% to 95% based on total weight of the dry dehulled pea; preferably in the presence of one or more *Lactobacillus* sp; preferably wherein the pH in the peas before fermentation is from 6.0 to 7.0, as measured at room temperature on 5 g of dry peas which have been milled with 95 g of water;
(ii) milling said peas;
(iii) fractionating said milled peas so as to obtain at least one protein comprising fraction, optionally simultaneously with step (ii), by adjusting the pH ranging of said milled peas to a pH of at least 6.0, for example ranging from 6.0 to 9.0, preferably from 7.0 to 9.0; preferably, this pH adjustment is performed on an aqueous composition comprising milled peas having a dry matter of at most 45%, preferably at most 40%, preferably at most 35%, preferably at most 30%, preferably at most 25%; in an embodiment, the dry matter content of the milled peas is adjusted to the above cited dry matter content by addition of water accordingly;
(iv) isolating or concentrating pea proteins from said at least one protein comprising fraction;
(v) obtaining said isolated or concentrated pea proteins as an aqueous slurry;
(vi) optionally subjecting said aqueous slurry to at least one heat treatment.

In a preferred embodiment, steps (iii) to (vi) of the above method comprise the following steps:
(1) fractionating said milled peas by separating a fraction comprising proteins from an insoluble fraction, preferably by decantation;
(2) subjecting the protein comprising fraction to heat treatment at a temperature ranging from 50° C. to 80° C.;
(3) precipitating the proteins comprised in said protein comprising fraction by isoelectric precipitation, preferably by adjusting the pH of said fraction to a value ranging from 4.5 to 5.8; preferably, this pH adjustment is performed on an aqueous protein comprising fraction having a dry matter of at least 1%, preferably having a dry matter ranging from 3 to 10%;
(4) isolating the precipitated proteins, preferably by decantation; thereby obtaining said isolated or concentrated pea proteins as an aqueous slurry;
(5) adjusting the pH of the aqueous slurry to a value ranging from 6.0 to 8.0, or alternatively adjusting the pH of the aqueous slurry to a value ranging from 4.5 to 5.8; preferably, this pH adjustment is performed on an aqueous slurry having a dry matter of at most 45%, preferably at most 40%, preferably at most 35%, preferably at most 30%, preferably at most 25%, and in an embodiment the dry matter may be adjusted to this extent by dilution with water;

(6) optionally subjecting the pH adjusted aqueous slurry to a heat treatment at a temperature ranging of at least 70° C., preferably at least 75° C., preferably a temperature ranging 75° C. to 210° C., preferably ranging from 85° C. to 160° C., for example from 90° C. to 150° C., for example from 95° C. to 140° C., preferably for a time ranging from 10 min to 0.01 s; and (7) drying the aqueous slurry.

In a preferred embodiment, steps (iii) to (vi) of the above method comprise the following steps:

(1) fractionating said milled peas by separating a fraction comprising proteins from an insoluble fraction, preferably by decantation;
(2) subjecting the protein comprising fraction to heat treatment at a temperature ranging from 50° C. to 80° C.;
(3) precipitating the proteins comprised in said protein comprising fraction by isoelectric precipitation, preferably by adjusting the pH of said fraction to a value ranging from 4.5 to 5.0; preferably, this pH adjustment is performed on an aqueous protein comprising fraction having a dry matter of at least 1%, preferably having a dry matter ranging from 3 to 10%;
(4) isolating the precipitated proteins, preferably by decantation; thereby obtaining said isolated or concentrated pea proteins as an aqueous slurry;
(5) adjusting the pH of the aqueous slurry to a value ranging from 6.0 to 8.0, preferably, this pH adjustment is performed on an aqueous slurry having a dry matter of at most 45%, preferably at most 40%, preferably at most 35%, preferably at most 30%, preferably at most 25%, and in an embodiment the dry matter may be adjusted to this extent by dilution with water;
(6) optionally subjecting the pH adjusted aqueous slurry to a heat treatment at a temperature ranging from 90° C. to 150° C., preferably for a time ranging from 10 min to 0.01 s;
(7) drying the aqueous slurry thereby obtaining said pea proteins.

In a preferred embodiment, steps (iii) to (vi) of the above method comprise the following steps:

(1) fractionating said milled peas by separating a fraction comprising proteins from an insoluble fraction, preferably by decantation;
(2) subjecting the protein comprising fraction to heat treatment at a temperature ranging from 50° C. to 80° C.;
(3) precipitating the proteins comprised in said protein comprising fraction by isoelectric precipitation, preferably by adjusting the pH of said fraction to a value ranging from 4.5 to 5.8; preferably, this pH adjustment is performed on an aqueous protein comprising at least 1.0% dry matter based on the total weight of the composition, preferably at least 2.0% dry matter, more preferably at least 3.0% dry matter, such as for instance at least 4.0% dry matter, such as for instance at least 5.0% dry matter; preferably comprising from 1.0% to 40% dry matter, preferably from 2.0% to 30% dry matter, more preferably from 3.0% to 20% dry matter, more preferably from 3.0% to 15% dry matter, such as from 3.0% to 10%;
(4) isolating the precipitated proteins, preferably by decantation; thereby obtaining said isolated or concentrated pea proteins as an aqueous slurry;
(5) adjusting the pH of the aqueous slurry to a value ranging from 4.5 to 5.8; preferably, this pH adjustment is performed on an aqueous slurry having a dry matter of at most 45%, preferably at most 40%, preferably at most 35%, preferably at most 30%, preferably at most 25%, and in an embodiment the dry matter may be adjusted to this extent by dilution with water;
(6) optionally subjecting the pH adjusted aqueous slurry to a heat treatment at a temperature ranging from 90° C. to 150° C., preferably for a time ranging from 10 min to 10.0 second; and
(7) drying the aqueous slurry, thereby obtaining said pea proteins.

The pea proteins obtained by the methods according to the present invention as described herein have different characteristics, such as different biochemical and/or organoleptic characteristics, as well as a difference in quality associated parameter values compared to known prior art pea proteins.

Accordingly, the present invention also encompasses pea proteins, pea protein extracts, and pea protein compositions obtained by or obtainable by the methods according to the invention as described herein.

The skilled person will understand that when referring to "pea proteins" in some embodiments, in fact a composition is described, which predominantly, but not exclusively comprises pea proteins. Residual impurities may be present in such compositions. Such residual impurities may include for instance minerals, sugars, etc. As used herein, the term pea proteins preferably refers to a pea protein extract or a composition comprising (based on dry matter) at least 70 wt % proteins, preferably at least 80 wt % proteins, more preferably at least 85 wt %. Preferably, the term pea proteins refers to a composition comprising (based on dry matter) from 70 wt % to 98 wt % of proteins, preferably from 80 wt % to 98 wt % of proteins, more preferably from 85 wt % to 98 wt % of proteins, more preferably from 88 wt % to 98 wt % of proteins.

In a further aspect, the present invention relates to a composition comprising pea proteins obtained by or obtainable by the methods according to the invention as described herein. In a preferred embodiment, such composition is an edible composition. As used herein, and as will be understood by the person skilled in the art, an "edible" composition refers to a composition which is suitable for human or animal consumption. Preferably said composition is a food or feed, more preferably a dairy product, confectionary product, beverage, meat product, vegetarian product, food supplement, nutritional product destined to weight control, sports, medical food and food for elderly, and a bakery food product. In a preferred embodiment, said food product is a biscuit, bread, cake, waffle, or fudge.

Accordingly, in a further aspect, the present invention relates to the use of the pea proteins as described herein, in particular the pea proteins obtained or obtainable according to the methods as described herein, in food or feed products. In a preferred embodiment, the food products are selected from the group comprising dairy products, confectionary products, beverages, meat products, vegetarian products, food supplements, nutritional products destined to weight control, sports, medical food and food for elderly, and bakery food products. In a preferred embodiment, the food products are bakery food products or confectionery food products. The pea proteins as described herein may for instance partially or completely replace other proteins in food or feed products, such as for instance proteins of animal origin, such as dairy proteins. Particularly suited applications of the pea proteins as described herein may for instance involve applications in which the Maillard reaction is involved, i.e. browning or glazing reactions, such as typically found in processes for preparing bakery food products or confectionery products.

The aspects and embodiments of the invention are further supported by the following non-limiting examples.

EXAMPLES

Protocols

Unless otherwise specified, in the examples below, all parameters are measured as defined in this section. The measurement of the parameters as defined in this section also represent in preferred embodiments the method for measuring said parameters according to the invention as indicated in the respective aspects and embodiments of the above detailed description.

pH Measurement on Dry Peas or Aqueous Composition Comprising Peas or Milled Peas pH was measured with a pH meter WTW SERIES Inolab Termil 740. The apparatus was calibrated with buffer solutions at pH 4.01 (WTW pH 4.01 Technical Buffer, Model STP4, Order no 108706) and pH 7 (WTW pH 7.00 Technical Buffer, Model STP7, Order no 108708).

When the pH was measured on the aqueous composition excluding peas, a sample of aqueous solution was taken directly from the fermentation vessel. The pH of the sample was measured once the value was stabilized.

When the pH was measured on peas, peas were taken from the fermentation vessel. Peas were drained in a strainer and then laid on absorbent paper during two minutes in order to remove juice excess. Peas were milled during one minute with a blender (Magic Bullet, Homeland Housewares). 1 g of milled peas was suspended in 9 g of deionized water (water conductivity<15 µS). The suspension was then milled again with the blender. Finally the pH of the suspension (at room temperature) was measured once the value was stabilized.

When the pH was measured on dry peas, peas were milled dry for one minute with a blender (Kenwood). 5 g of milled dry peas were suspended in 95 g of deionized water (water conductivity<15 µS). The suspension was then homogenized on a stirring plate for 1 minute. The pH of the suspension was measured once the value was stabilized.

pH Measurement on Protein Extract Powder pH was measured with a pH meter WTW pH/Cond 340i/SET. The apparatus was calibrated with buffer solutions at pH 4.01 (WTW pH 4.01 Technical Buffer, Model STP4, Order no 108706) and pH 7 (WTW pH 7.00 Technical Buffer, Model STP7, Order no 108708). 5.0 g of protein extract powder were introduced in a 100 ml beaker and made up to 50 g (balance Ohaus ARC120, sensitivity 0.01 g, capacity 3100 g) with demineralized water at room temperature. The suspension was stirred for 5 minutes on a stirring plate (Stuart US151) at intensity 4. The pH of the suspension was measured (at room temperature) under stirring once the value was stabilized.

pH Measurement of Food Products

The pH meter (Knick Portavo 902 PH) was calibrated with buffer solutions at pH 4.01 (WTW pH 4.01 Technical Buffer, Model STP4, Order no 108706) and pH 7 (WTW pH 7.00 Technical Buffer, Model STP7, Order no 108708). pH was measured by introducing the probe of pH meter (Knick Portavo 902 PH) directly inside the product (liquid food product, batter, dough . . . ) at room temperature. In case of solid food product, a dilution at 50% in demineralized water was performed and the solution was analyzed. After stabilization, pH value was noted.

Lactic Acid Bacteria Enumeration

Dilutions of sample were performed with EPT Dilucups 9 ml Led techno.

The medium used was MRS agar (acc. to DE MAN, ROGOSA and SHARPE) from Merck Cat. No 1.10661.0500.

Peas or peas suspension were milled with a grinder, Magic Bullet, Homeland Housewares.

When a sample of the aqueous composition excluding peas was analyzed, a sample was taken directly from the fermentation vessel. 1 ml of sample was plated. If a dilution was needed, 1 ml of sample was added to dilucup and this step was repeated until the correct dilution was reached and then 1 ml of diluted sample was plated. The petri dishes were incubated 48 hours at 45° C.

When a sample of peas was analyzed, whole peas were taken from the fermentation vessel. Peas were drained in a strainer and then laid on absorbent paper during two minutes in order to remove juice excess. Peas were milled during one minute. The milled peas were suspended (1 g of peas in 9 g of deionized water) in deionized water (conductivity<15 µS). The suspension was then milled with the blender. 1 ml of suspension was plated. If dilution was needed, 1 ml of the suspension was added to dilucup and this step was repeated until the correct dilution was reached and then 1 ml of diluted sample was plated. The petri dishes were incubated 48 hours at 45° C.

Dry Matter Determination

Total dry matter was determined gravimetrically as residue remaining after drying. Moisture was evaporated from sample by oven drying.

5 g of sample were weighed in a dry aluminium dish previously weighed (precision balance Ohaus, capacity 410 g, sensitivity 0.001 g). The sample was placed in an oven at 103° C. until the residual weight remained constant (at least 24 h). Sample was cooled in a desiccator for 1 h and then immediately weighed. Results are expressed in % (g of dry matter per 100 g of sample).

$$\text{Dry matter } (\%)=(m3-m1)/(m2-m1)\times100$$

m1=weight of the dry aluminium dish (in g)
m2=weight of the aluminium dish with the sample before drying (in g)
m3=weight of the aluminium dish with the sample after drying (in g)

Dry Matter Determination of Food Products

Dry matter content of food products was determined in duplicate after desiccation of 5 g sample at 104° C. for one night.

Determination of Protein Content by the Dumas Method

The apparatus (Leco FP2000) was calibrated with EDTA marketed by Leco under reference 502092. The Quantities of EDTA weighed for the realization of the calibration ranged from 0.08 g to 0.50 g (0.08 g, 0.15 g, 0.25 g, 0.35 g, 0.40 g, 0.50 g). 0.3 g to 1 g of sample was weighed on a precision balance (Sartorius BP61S, capacity 61 g, sensitivity 0.1 mg) and placed into a ceramic boat. The ceramic boat was automatically placed in an oven at 1200° C. wherein the sample was burnt in a combustion tube by pyrolysis under controlled oxygen flow. Nitrogen compounds are converted to N2 and NOx while other volatile decomposition compounds are retained through adsorbent filters and series of purification regents. All nitrogen compounds are reduced to molecular N, which is quantitatively determined by a thermal conductivity detector. The Nitrogen content was then calculated by a microprocessor.

Results are expressed as a percentage of protein (% N*6.25):

% Nitrogen=g of Nitrogen per 100 g of sample

% protein=% Nitrogen×6.25

Determination of Nitrogen Content in NSI Samples by the Dumas Method

The apparatus (Leco FP2000) was calibrated with a solution of glycine 15 mg/ml (glycine powder marketed by Merck under reference 1.04201.1000). The quantities of the glycine solution 15 mg/ml weighed for the realization of the calibration ranged from 0.1 g to 1.8 g (0.1 g, 0.4 g, 0.7 g, 1.1 g, 1.4 g, 1.8 g). 1 g to 1.8 g of sample was weighed on a precision balance (Sartorius BP61S, capacity 61 g, sensitivity 0.1 mg) and placed into a ceramic boat covered by a nickel insert. The ceramic boat was automatically placed in an oven at 1200° C. wherein the sample was burnt in a combustion tube by pyrolysis under controlled oxygen flow. Nitrogen compounds are converted to N2 and NOx while other volatile decomposition compounds are retained through adsorbent filters and series of purification regents. All nitrogen compounds are reduced to molecular N, which is quantitatively determined by a thermal conductivity detector. The Nitrogen content was then calculated by a microprocessor.

Results are expressed as a percentage of Nitrogen:

% Nitrogen=g of Nitrogen per 100 g of sample

Determination of Nitrogen Solubility Index (NSI)

After dispersion of proteins in demineralized water, nitrogen solubility index was determined by measuring the ratio between the percentage of nitrogen in the supernatant after centrifugation and the percentage of nitrogen in the starting suspension. The method was used on a protein extract powder with a dry matter content of 90 to 99% (weight basis) and was done in the month after drying of the protein extract. The measurement was done at room temperature.

9.0 g of sample were introduced in a 400 ml beaker and made up to 300 g (balance Ohaus ARC120, sensitivity 0.01 g, capacity 3100 g) with demineralized water at room temperature. The suspension was homogenized with a spoon and then stirred for 5 minutes on a stirring plate (Stuart US151) at intensity 4. 10 ml of the starting suspension were collected and analyzed for the nitrogen content on a protein analyzer Leco FP 2000. The suspension was split into two beakers of 150 ml, the pH was raised in one and decreased in the other. The pH of the suspension was adjusted to pH 3.5, 4.5, 5.5, 6.5, 7 and 8 with HCl 1N or NaOH 1N (pH-meter WTW pH/Cond 340i/SET). For each pH adjustment, the pH value was recorded once stabilized and 10 ml of the suspension were collected in a 10 ml centrifuge tube. Aliquots of the suspension at different pH were centrifuged 15 min at 6000 rpm (centrifuge ALC 4239 R). The different supernatants were collected and analyzed for the nitrogen content on a protein analyzer Leco FP 2000. For each tested pH, the nitrogen solubility index was calculated according to the following expression:

% Nitrogen solubility index=% Nitrogen in supernatant/% Nitrogen in starting solution×100

Determination of Isoelectric pH of the Protein Comprising Fraction 300 g of protein comprising fraction having a protein content of 1 wt % based on the total weight of the protein comprising fraction were introduced in a 400 ml beaker at room temperature. The suspension was stirred for 5 minutes on a stirring plate (Stuart US151) at intensity 4. 10 ml of the starting suspension were collected and analyzed for the nitrogen content on a protein analyzer Leco FP 2000. The suspension was split into two beakers of 150 ml, the pH was raised in one and decreased in the other. The pH of the suspension was adjusted to pH 3.5, 3.75, 4.0, 4.25, 4.5, 4.75, 5.0, 5.25, 5.5, 5.75, 6.0, 6.25, 6.5, 6.75, and 7.0 with HCl 1N or NaOH 1N (pH-meter WTW pH/Cond 340i/SET). For each pH adjustment, the pH value was recorded once stabilized and 10 ml of the suspension were collected in a 10 ml centrifuge tube. Aliquots of the suspension at different pH were centrifuged 15 min at 6000 rpm (centrifuge ALC 4239 R). The different supernatants were collected and analyzed for the nitrogen content on a protein analyzer Leco FP 2000. For each tested pH, the nitrogen solubility index was calculated according to the following expression:

% Nitrogen solubility index=% Nitrogen in supernatant/% Nitrogen in starting solution×100

The isoelectric pH was determined as the pH at which the nitrogen solubility index was the lowest.

Determination of Sugars

Sample was prepared with a centrifuge eppendorf Centrifuge 5417R and with Centrifugal Devices NANOSEP 100 k OMEGA.

Peas or peas suspension were milled with a blender, Magic Bullet, Homeland Housewares.

When a sample of the aqueous composition excluding peas was analyzed, a sample was taken directly from the fermentation vessel. The sample was diluted 20 times (1 g of pea juice in 19 g of deionized water) with deionized water (conductivity<15 µS). 0.5 ml of this dilution was placed in a filtering eppendorf and centrifuged at 14000 rpm during 10 minutes. The filtrate was then used for sugar analysis.

When a sample of peas was prepared, a whole peas were taken from the fermentation vessel. Peas were drained in a strainer and then laid on absorbent paper during two minutes in order to remove juice excess. Peas were milled during one minute. The milled peas were suspended (1 g of peas in 9 g of deionized water) in deionized water (conductivity<15 µS). The suspension was then milled with the blender.

The suspension was diluted 8 times (1 g of suspension of pea in 8 g of deionized water) with deionized water (conductivity<15 µS). 0.5 ml of this dilution was placed in a filtering eppendorf and centrifuged at 14000 rpm during 10 minutes. The filtrate was then used for sugar analysis.

A Thermo scientific—Dionex ICS 5000 chromatographic system with chromeleon 6.80 SR11 Build 3161 software has been used for the sugar analysis. Separation was done by a Carbopac PA100 4 mm*250 mm (+ guard) at 40° C. Elution was done with NaOH 40 mM at a flow rate of 1 ml/min. Injection volume was 10 µL. The quadruple pulse detection was used for the PAD detection. Calibration was done with appropriate standard solutions ranging for each of the following sugars:

Concentration of the sugars standard solution (st1, 2, 3 and 4) (mg/l) are given in the below table.

|  | st1 | st2 | st3 | st4 |
| --- | --- | --- | --- | --- |
| Glucose | 15.3 | 45.8 | 5.2 | 30.5 |
| Fructose | 3.3 | 7.4 | 1.1 | 5.5 |
| Saccharose | 99.9 | 200.5 | 50.1 | 150.0 |
| Raffinose | 15.3 | 45.1 | 5.0 | 30.6 |

-continued

|  | st1 | st2 | st3 | st4 |
|---|---|---|---|---|
| Stachyose | 75.0 | 159.7 | 40.0 | 119.7 |
| Verbascose | 57.0 | 118.6 | 37.9 | 85.0 |

Acidity Measurement

Acidity was measured with a pH meter WTVV SERIES Inolab Termil 740. The apparatus was calibrated with buffer solutions at pH 4.01 (WTVV pH 4.01 Technical Buffer, Model STP4, Order no 108706) and at pH 7 (WTW pH 7.00 Technical Buffer, Model STP7, Order no 108708).

Peas or peas suspension were milled with a blender, Magic Bullet, Homeland Housewares.

When the acidity of the "pea juice" was measured, a sample (A) was taken directly from the fermentation vessel. The sample (A) was weighed. 1 mol/L sodium hydroxide solution (C) (no 1.09137.1000 TitriPURR; Density=d=1.04 kg/l) was added slowly until the pH of the sample was stabilized at pH 7 during at least two minutes. The mass of sodium hydroxide (B) was then calculated.

$$\text{Acidity (mEq/kg)}=(B*(C/d)/A)*1000$$

When the acidity of the peas was measured, whole peas were taken from the fermentation vessel. Peas were drained in a strainer and then laid on absorbent paper during two minutes in order to remove juice excess. Peas were milled during one minute. Milled peas were suspended (1 g of peas in 9 g of deionized water) in deionized water (conductivity<15 µS). The suspension was then milled with the blender. A pea suspension was obtained.

An exact amount of the pea suspension (A') was weighed. 1 mol/L sodium hydroxide solution (C') (no 1.09137.1000 TitriPURR; Density=d=1.04 kg/l) was added slowly until the pH of the suspension was stabilized at pH 7 during at least two minutes. The mass of sodium hydroxide (B') was then calculated.

$$\text{Acidity (mEq/kg)}=(B'*(C'd)/(A'10))*1000$$

Ash Determination

Ash content was determined gravimetrically as residue remaining after heating in a high temperature muffle furnace. Moisture was evaporated from sample by oven drying.

2 g of sample were weighed in a dry porcelain crucible previously weighed (precision balance Ohaus, capacity 410 g, sensitivity 0.001 g). The crucible was placed in a muffle furnace at 550° C. for 24 h. The crucible was placed for 1 h in an oven at 103° C. and then in a desiccator for 1 h. After cooling the crucible was weighed. Results are expressed in % (g of ash per 100 g of sample).

$$\text{Ash (\%)}=(m3-m1)/(m2-m1)\times 100$$

m1=weight of the crucible (in g)
m2=weight of the crucible with sample (in g)
m3=weight of the crucible with ash (in g)

Determination of Potassium Content by ICP-AES

Potassium determination was realized by ionization of the sample in inert gas plasma. The apparatus ICP-AES (Inductively Coupled Plasma—Atomic Emission Spectrometry) was calibrated with Potassium chloride marketed by Merck under reference 104938. Weights of potassium chloride used for the calibration were adapted according to the potassium content of the sample. 2 g of ashes were prepared from the sample according to the ash determination method. The ashes were diluted in demineralized water so as to be in the reading range of the apparatus. The solution was filtered on paper Whatman 595 1/2 185 mm. The filtered sample was ionized by injection in the ICP-AES. Results are expressed in mg/kg or ppm (mg of potassium per kg of sample).

Determination of Magnesium Content by ICP-AES

Magnesium determination was realized by ionization of the sample in inert gas plasma. The apparatus ICP-AES (Inductively Coupled Plasma—Atomic Emission Spectrometry) was calibrated with Magnesium ICP standard marketed by Merck under reference 170331 (1000 mg/L) or 170379 (10000 mg/L). Weights of Magnesium ICP standard used for the calibration were adapted according to the magnesium content of the sample. 2 g of ashes were prepared from the sample according to the ash determination method. The ashes were diluted in demineralized water so as to be in the reading range of the apparatus. The solution was filtered on paper Whatman 595 1/2 185 mm. The filtered sample was ionized by injection in the ICP-AES. Results are expressed in mg/kg or ppm (mg of magnesium per kg of sample).

Determination of Viscosity with the Viscometer Brookfield DVII

The determination of a protein suspension viscosity with a viscometer Brookfield DVII is the measure of its resistance to flow imposed by the rotation of a cylindrical probe. This resistance causes the twist of a spring fixed to the sensor of a drive system. The value of viscosity, expressed in centiPoise (cP), is proportional to the percentage of torsion indicated by the viscometer and to a multiplicative factor depending on the used probe and its rotation speed. The method was used on a protein extract powder with a dry matter content of 90 to 99% (weight basis) and was done in the month after drying of the protein extract. The measurement was done at room temperature.

A suspension of 13.5% proteins (weight basis) was prepared. 75 g of sample were weighed (balance Ohaus ARC120, sensitivity 0.01 g, capacity 3100 g) in a 250 ml beaker and the necessary amount of demineralized water was weighed in a 1 L plastic beaker, both at room temperature. The powder was suspended in water under mechanical stirring (IKA, EURO-ST.P CV) at 700 rpm for 5 minutes with the use a dissolver 80 cm diameter (marketed by Roth under reference A322.1). The pH of the suspension was measured under stirring (pH-meter WTVV pH/Cond 340i/SET). The agitation was stopped for 3 minutes and the viscosity of the suspension was measured at three different locations with a viscometer Brookfield DVII+Pro at speed 50 rpm. The probe used for the measure was chosen between SO1 to SO7 such that the percentage of torsion was between 20% and 80%. The viscosity value was recorded after 4 seconds of probe rotation. The suspension was placed again under mechanical stirring for 5 minutes at 700 rpm during which the pH was adjusted to 6.4 with HCl 3N. The agitation was stopped for 3 minutes and the viscosity of the suspension was measured in the same way as previously. Similarly, the viscosity of the suspension was measured at pH 6.2, 6.0 and 5.8 after 5 min of stirring at 700 rpm and 3 minutes of rest.

When the initial pH of the suspension at 13.5% of proteins was equal to or below 5.8, the pH was raised to pH 7.5 with NaOH 3N, instead of being decreased with HCl 3N.

Color Measurement

L*a*b* coordinates were measured at 20° C. using a Chroma meter CR5 (Konica Minolta TA Sensing, Europe). L* denotes lightness on a 0-100 scale from black to white; a*, (+) red or (−) green; and b*, (+) yellow or (−) blue.

Apparatus:

Chromameter CR5 (Konica Minolta TA Sensing Europe).

Petri-dish CR-A502

Procedure: Preparation of Sample the Petri-dish was filled with the sample to analyze in a uniform surface.

Method the Petri-dish was placed on the apparatus at the place specifically reserved and start the analysis Results L* a* b* values are given by the Chromameter (average of 3 measurements).

Sensory Analysis for Proteins in Solution

Sensory evaluation was conducted by a 5-member trained panel. Training of the panelists was based on the recognition of 6 characteristics (sweetness, bitterness, metallic taste, saltiness, acidity, umami and astringency). A descriptive analysis was performed based on 4% dispersions. After discussion to reach a consensus, the descriptive terms that were most important for characterizing the appearance, texture and flavor of the solutions were selected.

Water Activity

Water activity is a measure of the energy status of the water in a system. It is defined as the vapor pressure of water in a substance divided by that of pure water at the same temperature; therefore, pure distilled water has a water activity of exactly one. Water activity (aw) determination was carried out using Rotronic Hygroskop DT, Krautli.

A cell was filled with the sample to be characterized and placed in the measurement chamber (Rotronic Hygroskop DT, Krautli). After stabilization, water activity value was recorder.

Sensory Analysis for Baked Goods

Sensory evaluation was conducted by a 5-member trained panel. Training of the panelists was based on the recognition of 6 characteristics (sweetness, bitterness, metallic taste, saltiness, acidity, umami and astringency). A descriptive analysis was performed on the finished products. After discussion to reach a consensus, the descriptive terms that were most important for characterizing the appearance, texture and flavor of the products were selected.

Biscuit Hardness:

Biscuit hardness is defined as the force required for breaking a biscuit by a knife. Biscuit hardness was assessed by Texture Analyzer Ta-XT2i.

Apparatus:

Texture Analyzer TA-XT2i (Stable Micro Systems, Ltd)

Compression load cell, 25 kg

Blade set with knife (HDP/BSK)

Procedure:

Position upper crosshead limit so that Warner Bratzler blade is 1 mm above the surface of the sample TA-XT2i settings:

Measure force in compression—Return to start

Pre-test speed: 3 mm/s

Test speed: 2 mm/s

Post-test speed: 10 mm/s

Distance of penetration: 5 mm

Trigger type: Auto—3 g

Penetration test begin. Results were recorded by Texture Analyzer and plotted into a graph Results Biscuit hardness was the maximum force recorded during the test (expressed as "max force"). Test results were obtained from 20 samples and the average value was calculated.

Example 1: Method for Extracting Pea Proteins According to an Embodiment of the Present Invention This example was performed following the protocol as schematically represented in FIG. 1.

Peas harvested dry, herein referred as "dry peas" (having a dry matter content (based on total weight of dry peas) of about 87%) were sieved and destoned by passage through a destoner. Subsequently, the peas were dehulled in a dehuller.

The peas were next subjected to fermentation with lactic acid bacteria (with *Lactobacillus fermentum*). Hereto the peas were soaked in drinkable water in a batchwise fashion. In subsequent batches, part of the fermentation medium (aqueous phase excluding peas) of a previous batch was used as an inoculum to effect subsequent fermentation. Peas were subjected to fermentation in the presence of about $10^8$ cfu of lactic acid bacteria per ml of aqueous composition comprising peas. 400 kg of peas per m$^3$ of total volume of aqueous composition comprising peas were placed in a vessel. Fermentation was effected anaerobically in a closed vessel without degassing at a temperature of about 40° C., until a pH in the peas of 4.4 was reached. During fermentation, the aqueous phase in the fermentation vessel was recirculated at about 20 m$^3$/hour. The peas were fermented for a duration of 480 min. At the end of fermentation, the peas had absorbed water in a quantity of about their initial mass before fermentation and had a dry matter content of about 43% (based on weight).

After fermentation, the peas were removed from the fermentation medium. The peas were then placed in a perforated rotating drum and washed to remove the remaining fermentation medium. After cleaning, the peas were subjected to wet milling. During milling, additional drinkable water was added such that the final composition had a dry matter content of about 25% (on weight basis). During the milling step, the pH was adjusted to about 8 by addition of sodium hydroxide.

After milling and pH adjustment, the milled pea paste was subjected to centrifugal decantation. The supernatant containing proteins and soluble impurities had a dry matter content of about 4% (on weight basis).

The aqueous protein fraction was subsequently subjected to heat treatment at 75° C. for 15 seconds in a plate heat exchanger.

Subsequently, the pea proteins were isolated by isoelectric precipitation. Hereto, the pH of the pea protein containing fraction was adjusted to 4.7 with sulfuric acid. Separation of the precipitated/aggregated proteins was performed by centrifugal decantation. The resulting pea proteins containing fraction (aqueous slurry) had a dry matter content of about 25% (based on weight). Drinkable water was added until a dry matter content of 14% was reached (based on weight).

Next, the pH of the aqueous slurry was adjusted to 7.6 with sodium hydroxide. The aqueous slurry was then subjected to heat treatment by heating to about 90° C. by means of plate heat exchanger, and maintaining slurry at a temperature of about 90° C. for 7 min.

Finally, the slurry was spray dried. The inlet temperature of the spray dryer was about 150° C. and the outlet temperature was about 70° C.

Example 2: Evolution of Sugar and pH/Acidity Content in the Peas During the Fermentation Step of a Method According to an Embodiment of the Invention This example was performed following the protocol described below. The experiment was repeated about 65 times with different duration of fermentation.

Peas harvested dry, herein referred as "dry peas" (having a dry matter content (based on total weight of dry peas) of about 87%) were sieved and destoned by passage through a destoner. Subsequently, the peas were dehulled in a dehuller.

The peas were next subjected to fermentation with lactic acid bacteria (with *Lactobacillus fermentum*). Hereto the peas were soaked in drinkable water in a batchwise fashion. In subsequent batches, part of the fermentation medium (aqueous phase excluding peas) of a previous batch was used as an inoculum to effect subsequent fermentation. Peas were subjected to fermentation in the presence of $10^8$ cfu of lactic acid bacteria per ml of aqueous composition comprising peas. 400 kg of peas per $m^3$ of total volume of aqueous composition comprising peas were placed in a vessel. Fermentation was effected anaerobically in a closed vessel without degassing at a temperature of about 40° C. During fermentation, the aqueous phase in the fermentation vessel was recirculated at about 20 $m^3$/hour. The peas were fermented for different durations as resumed in FIG. 2. After fermentation, the peas were removed from the fermentation medium and subjected to different analyses.

Sugar content in dehulled dry peas before fermentation was calculated on 20 samples of peas and was an average of 8 wt % (on dry matter) with a minimum of 6.4 wt % and a maximum of 9 wt %. Sugar content was based on the total concentration of glucose, fructose, saccharose, verbascose, raffinose, stachyose, and galactose.

Figure 2:
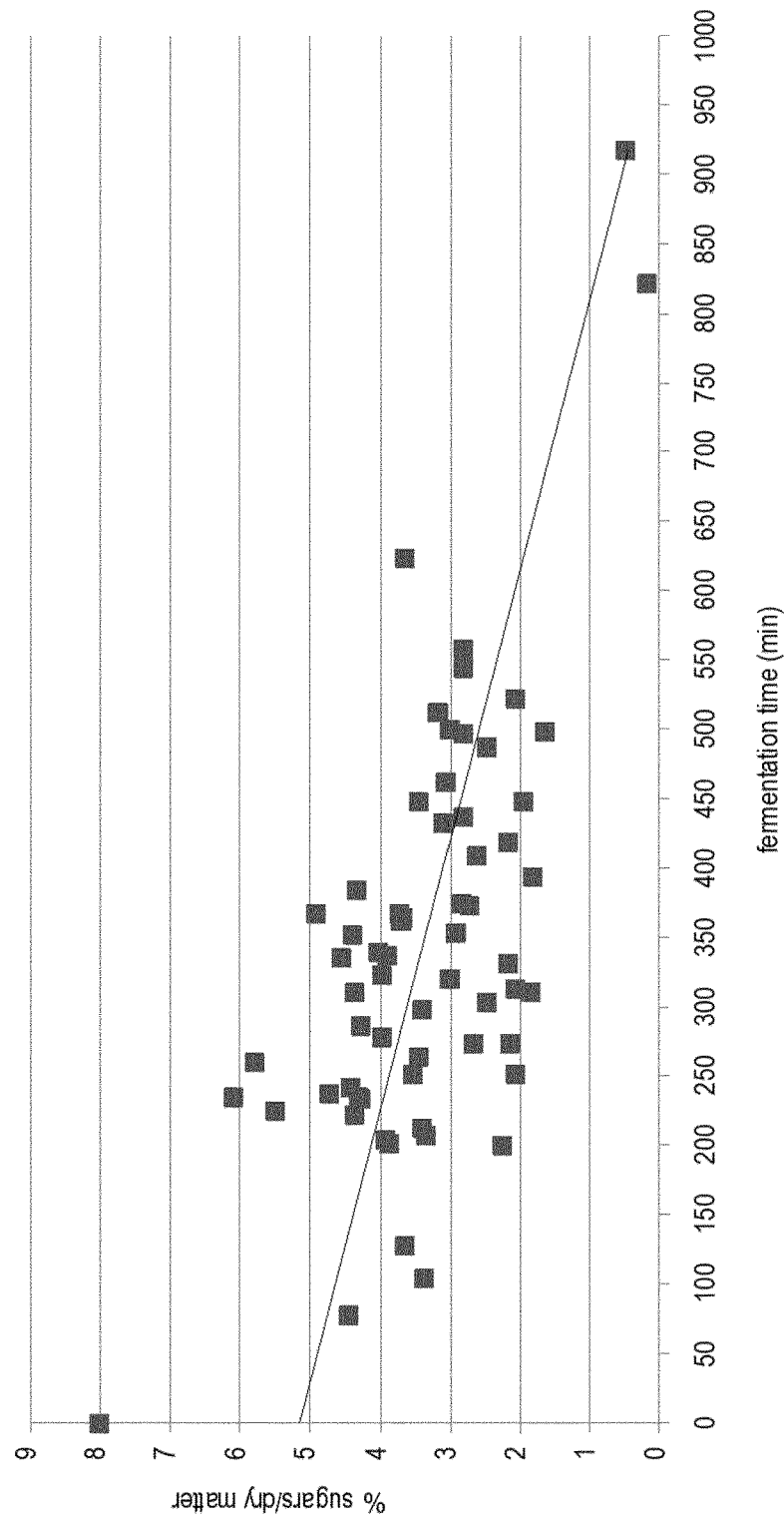
FIG. 2 represents a graph plotting the concentration of sugar/dry matter in % as a function of the fermentation time for fermented peas.

The evolution of sugar content in peas over time of fermentation is shown in FIG. 2.

Figure 3:
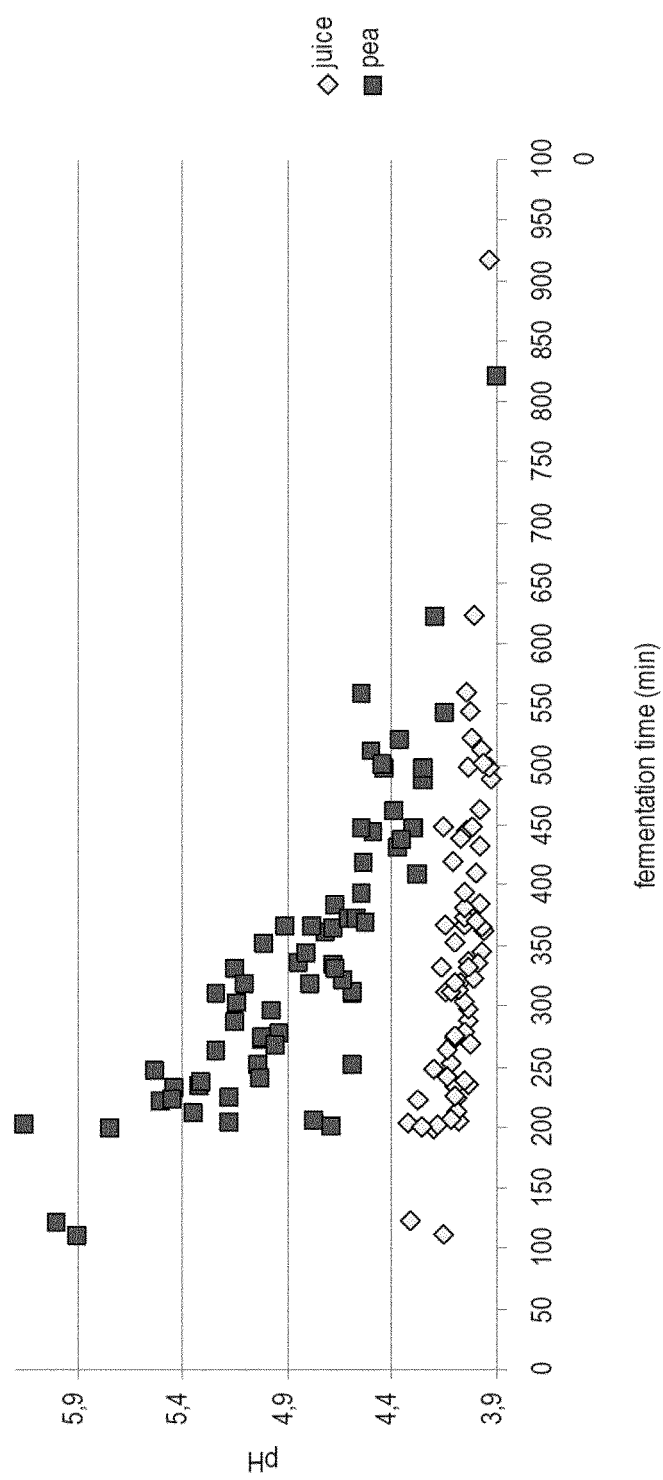
FIG. 3 represents a graph plotting the pH of the dehulled peas and the pH of the aqueous solution (juice) as a function of the fermentation time.
Figure 4:
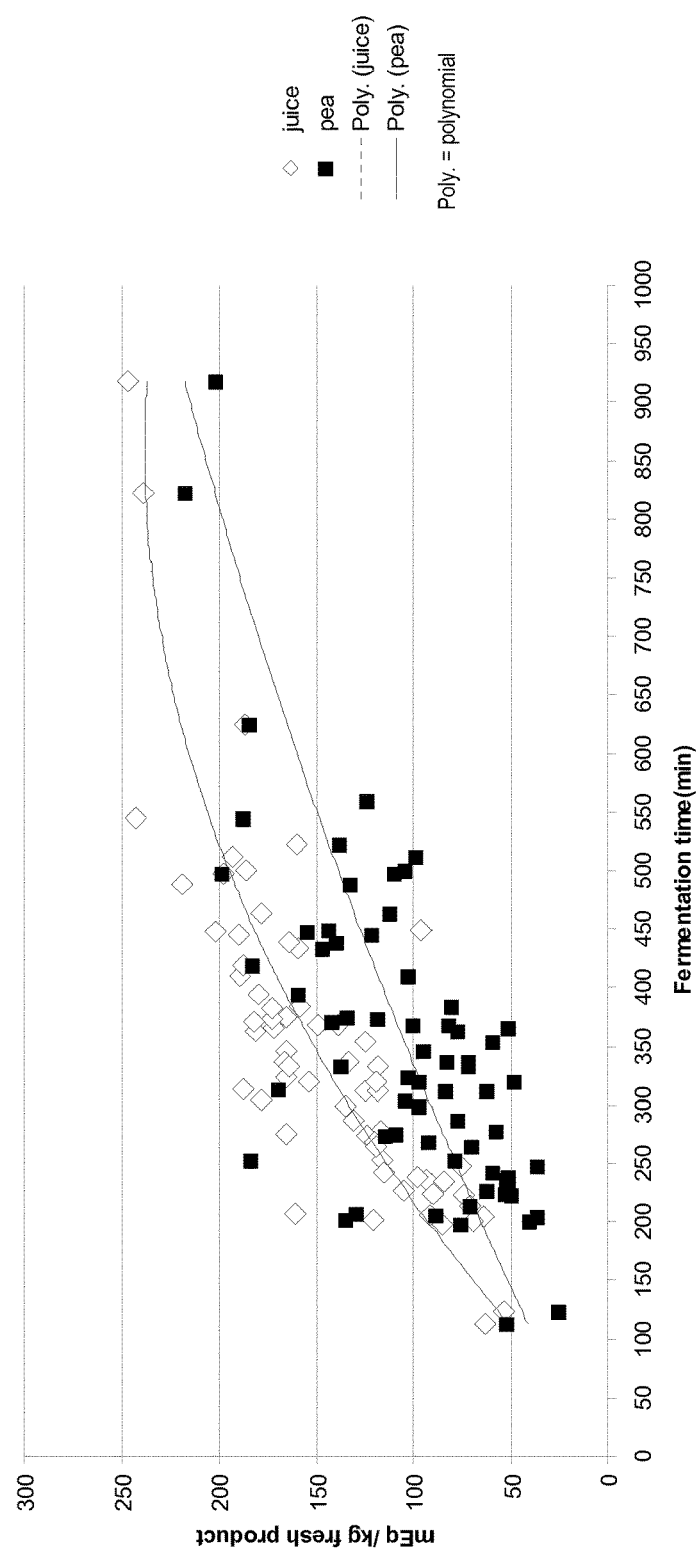
FIG. 4 represents a graph plotting the acidity of the dehulled peas and the acidity of the aqueous solution (juice) as a function of the fermentation time.

The pH and acidity of the fermentation medium, as well as the pH and acidity of the peas, were evaluated over time of fermentation. FIGS. 3 and 4 illustrate the evolution of respectively pH and acidity both inside the peas as well as of the fermentation medium (also referred as juice).

Example 3: Evolution of Bacterial Growth During Spontaneous Fermentation Step of a Method According to an Embodiment of the Invention This example was performed following the protocol described below. The experiment was repeated 7 times.

Peas harvested dry, herein referred as "dry peas" (having a dry matter content (based on total weight of dry peas) of about 87%) were sieved and destoned by passage through a destoner. Subsequently, the peas were dehulled in a dehuller.

The peas were next subjected to spontaneous fermentation with lactic acid bacteria. Hereto the peas were soaked in drinkable water in a batchwise fashion. No inoculum was used to effect the fermentation. 400 kg of peas per $m^3$ of total volume of aqueous composition comprising peas were placed in a vessel. Fermentation was effected anaerobically in a closed vessel without degassing at a temperature of about 40° C. for the experiments 1 to 6 and at a temperature of about 45° C. for the experiment 7 (lab kinetic). During fermentation, the aqueous phase in the fermentation vessel was recirculated. Peas were subjected to fermentation for a duration ranging from 100 min to 900 min as shown in FIG. 5.

Figure 5:
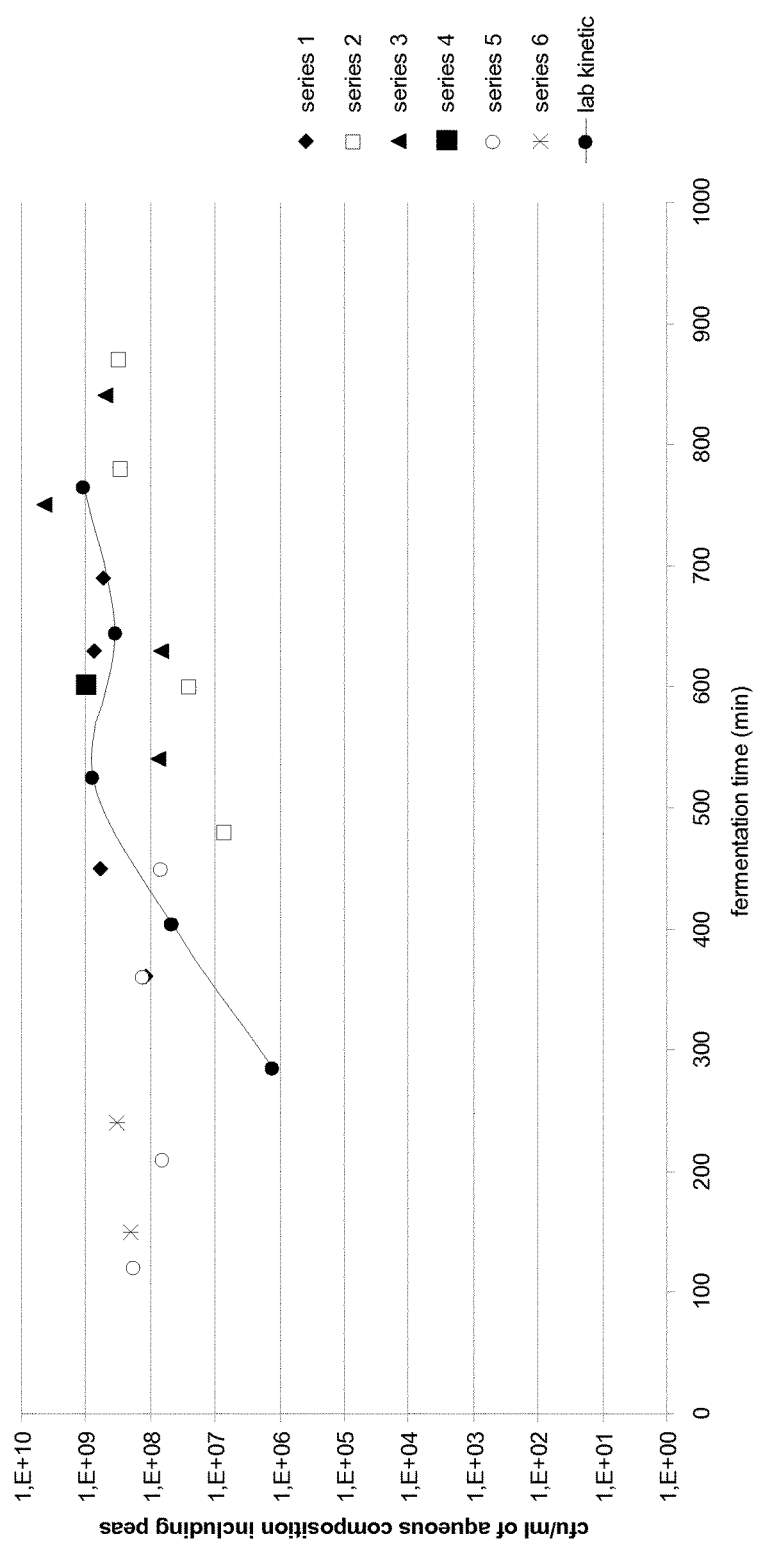
FIG. 5 represents a graph plotting the lactic acid bacteria concentration of the aqueous solution (juice) contained in first fermentation tanks of a series of experiments as a function of the fermentation time.

FIG. 5 represents a graph plotting the lactic acid bacteria concentration of the aqueous composition including peas contained in first fermentation tanks of a series of experiments as a function of the fermentation time.

Example 4: Measure of the pH of Different Water, with or without Addition of Dehulled Grinded Dry Peas All pH were measured at room temperature with a pH-meter calibrated the day of measurements prior to use.

Table 1 illustrates pH of the different types of water used: tap water, deionized water, and treated well water. The well water was treated so as to be safe for human consumption in accordance with European directive 98/83/CE (also referred herein as drinkable water).

TABLE 1

| Water | pH |
|---|---|
| Tap water | 7.54 |
| Deionized water | 7.75 |
| Treated well water | 7.52 |

Table 2 illustrates the pH of suspensions of dehulled grinded dry peas containing 25 wt % dry matter content. The pH was determined after suspending milled peas in different types of water for 1 min under magnetic stirring (200 rpm).

TABLE 2

| Water | pH |
|---|---|
| Tap water | 6.43 |
| Deionized water | 6.38 |
| Treated well water | 6.49 |

Table 3 illustrates the pH of suspensions of dehulled grinded dry peas in treated well water containing increasing concentrations of dry matter content. The pH was determined after suspending milled peas in water for 1 min under magnetic stirring (200 rpm).

TABLE 3

| wt % dry matter of suspensions | pH |
|---|---|
| 5 | 6.86 |
| 15 | 6.57 |
| 25 | 6.49 |
| 35 | 6.36 |
| 45 | 6.35 |

Table 4 illustrates the pH of aqueous phases (excluding peas) of suspensions of whole dehulled dry peas (270 g peas+520 g water) in the indicated types of water which were subsequently homogenized for 5 sec. The pH was measured immediately after homogenization of peas and water.

TABLE 4

| Water | pH |
|---|---|
| Tap water | 6.69 |
| Deionized water | 6.4 |
| Treated well water | 7.01 |

Example 5: Comparison of Protein Extraction Methods with Fermentation (According to an Embodiment of the Invention) or without Fermentation (Comparative Example)

Protein extract 3 (product 3) was prepared (according to the invention) as described in example 1 from dry dehulled peas using a method comprising a fermentation step (fermentation for 8 h at 40° C. in the presence of *Lactobacillus fermentum*). The experiment was repeated using identical conditions and product 4 was obtained.

Protein extract 1 (product 1) was prepared (not according to the invention) from dry dehulled peas which had not been subjected to a fermentation step but only a hydration step (hydration for 40 minutes at 15° C.). The experiment was repeated using identical conditions and product 2 was obtained.

In all the cases the peas were hydrated, although to a slightly lesser extent in the set-up without fermentation with a dry matter content of the peas of 67% (weight basis). After hydration and/or fermentation, the peas were in all cases removed from the aqueous phase and subjected to wet milling in presence of additional drinkable water such that the final composition had a dry matter content of about 24%. With the set up without fermentation the pH of the peas did not drop and was about 6.5, while for the fermentation set up the pH of the peas was drastically reduced and reached a value of 4.4. After milling the process of extraction was similar in both cases until the drying step and as described in example 1. It was observed that protein purity after milling was lower in the set-up without fermentation. Also, the tendency of fouling of the heat exchangers during subsequent heat treatment was increased in the set-up without fermentation. After milling, protein precipitation, as well as resulting dry matter content reached a similar efficiency in both the set-up with and without fermentation. In the final pea protein extracts, the protein purity was lower in the set-up without fermentation. Also, the total amount of sugars in the final pea protein extract was higher in the set-up without fermentation.

The differences in physico-chemical and functional properties of the extracted proteins with or without fermentation can be summarized as follows:

the general composition was similar, although the protein extract obtained without inclusion of the fermentation step had a higher $K^+$ (3×) and a higher $Mg^{2+}$ (×1.6) content compared to the protein extract obtained with inclusion of the fermentation step Table 5 summarizes the potassium and magnesium content (on dry basis) given as ppm/dry matter (ppm/DM) of the products 2 and 4.

TABLE 5

Figure 6:
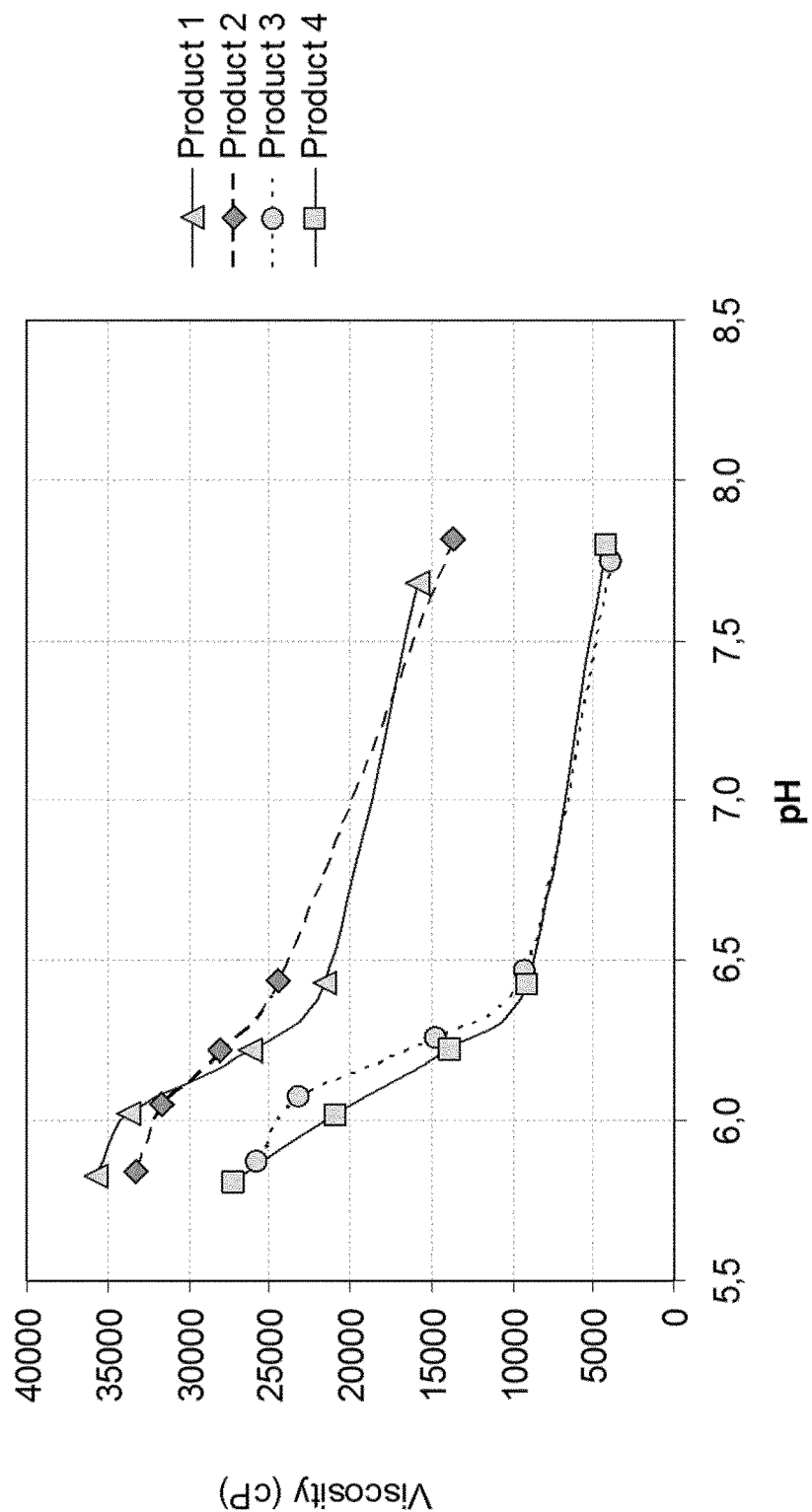
FIG. 6 represents a graph plotting the viscosity profile of pea protein extracts as a function of the pH.
Figure 7:
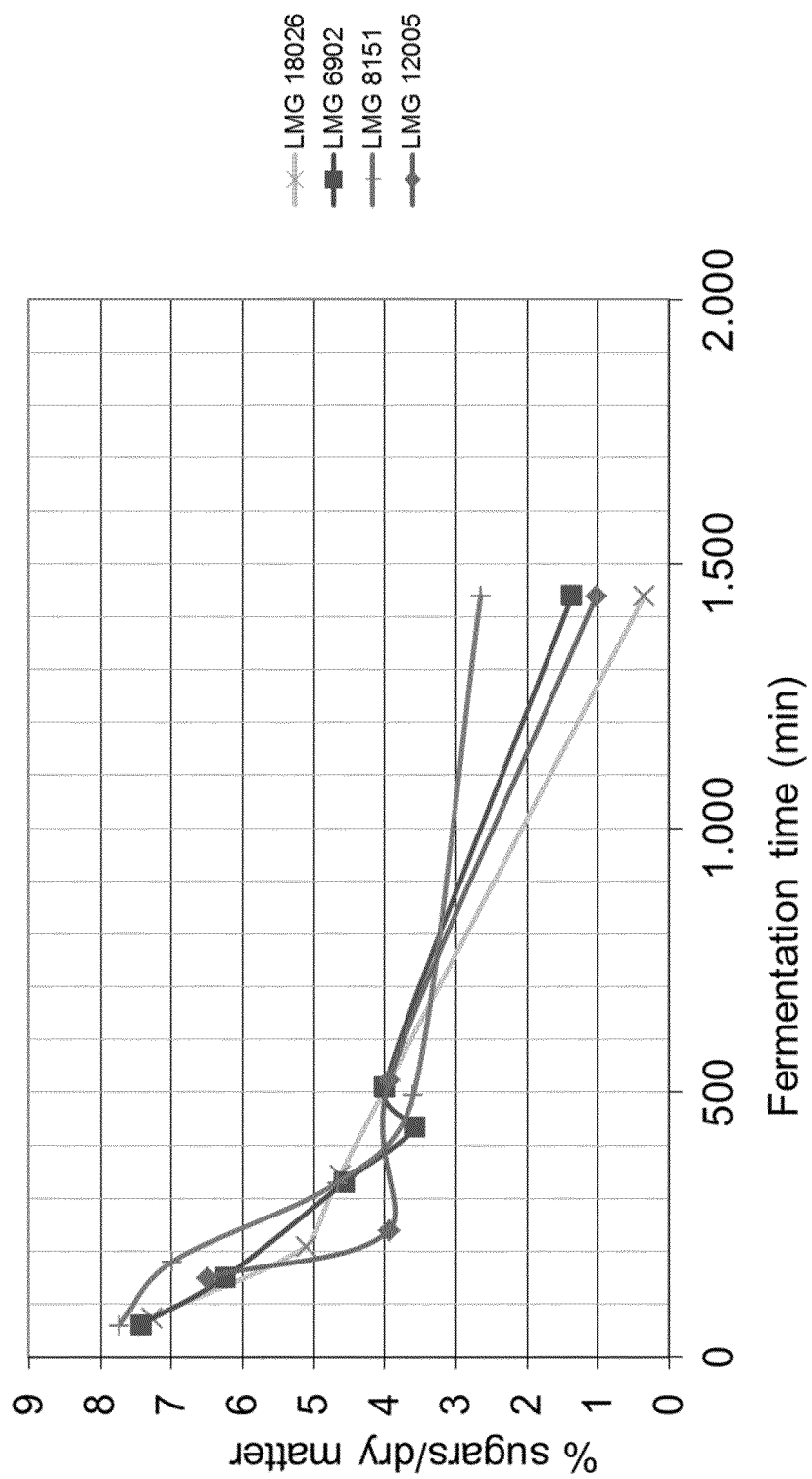
FIG. 7 represents a graph plotting the concentration of sugar/dry matter in % as a function of the fermentation time for fermented peas with *Lactobacillus fermentum* LMG 18026, *Lactobacillus fermentum* LMG 6902, *Lactobacillus Acidophilus* LMG 8151 or *Lactobacillus Crispatus* LMG 12005.
Figure 8:
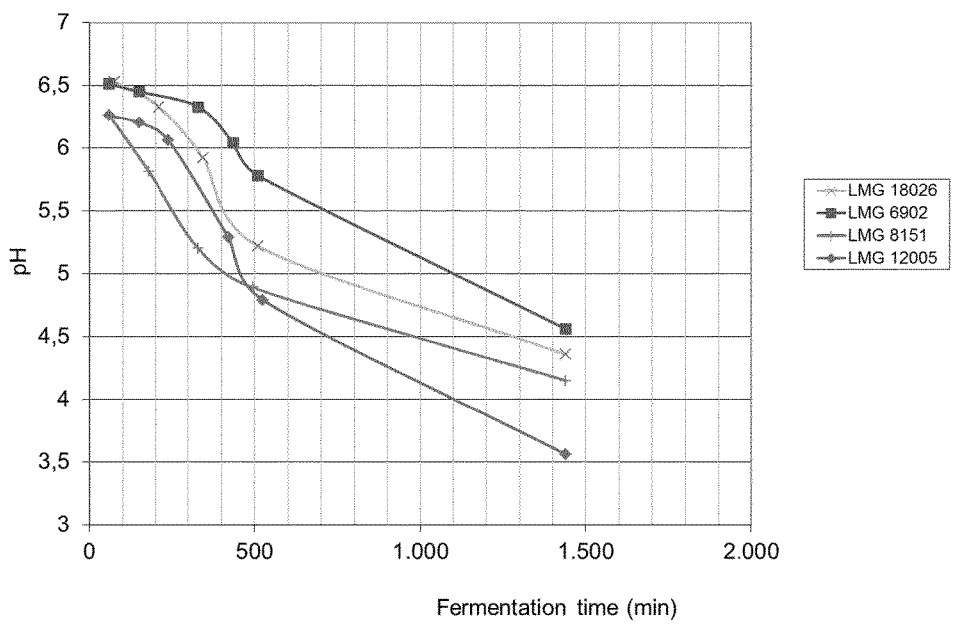
FIG. 8 represents a graph plotting the pH of the dehulled peas (8A) fermented with *Lactobacillus fermentum* LMG 18026, *Lactobacillus fermentum* LMG 6902, *Lactobacillus Acidophilus* LMG 8151 or *Lactobacillus Crispatus* LMG 12005 and the pH of the aqueous solution (juice) (8B) as a function of the fermentation time.
Figure 8:
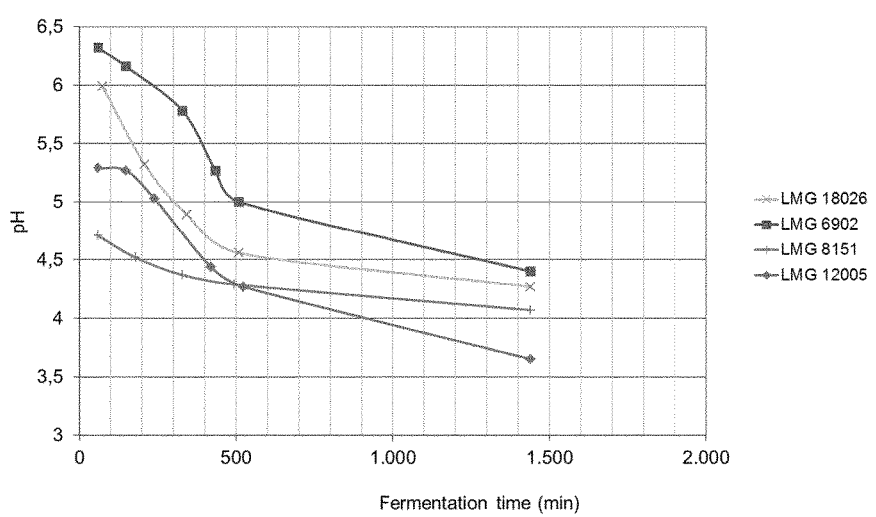
Figure 9:
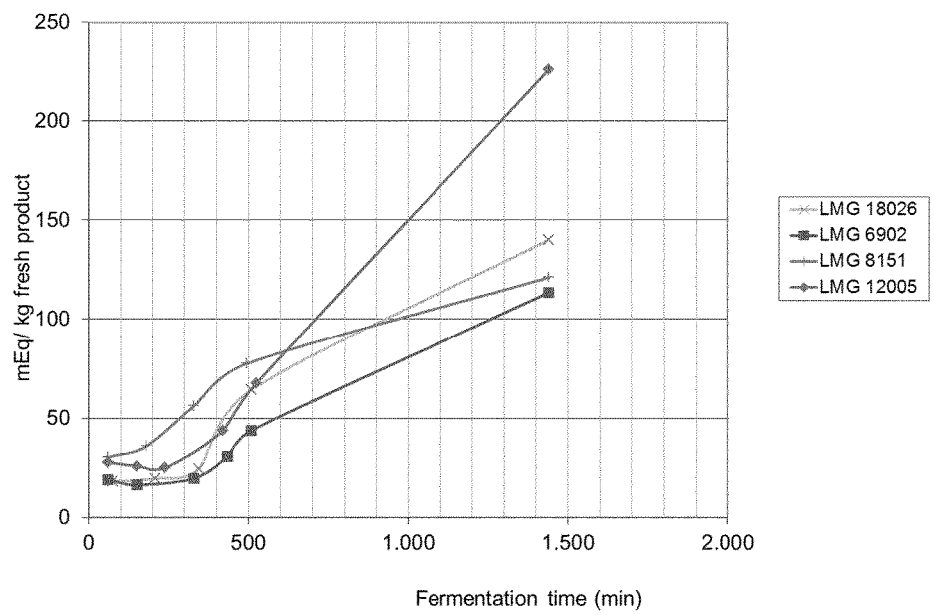
FIG. 9 represents a graph plotting the acidity of the dehulled peas (9A) fermented with *Lactobacillus fermentum* LMG 18026, *Lactobacillus fermentum* LMG 6902, *Lactobacillus Acidophilus* LMG 8151 or *Lactobacillus Crispatus* LMG 12005 and the acidity of the aqueous solution (juice) (9B) as a function of the fermentation time.
Figure 9:
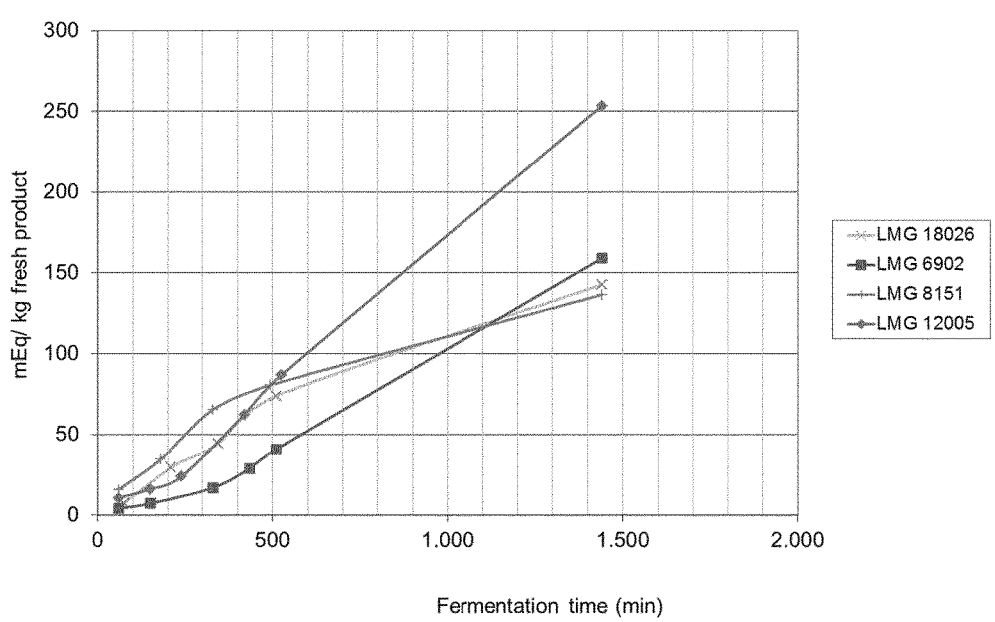
Figure 10:
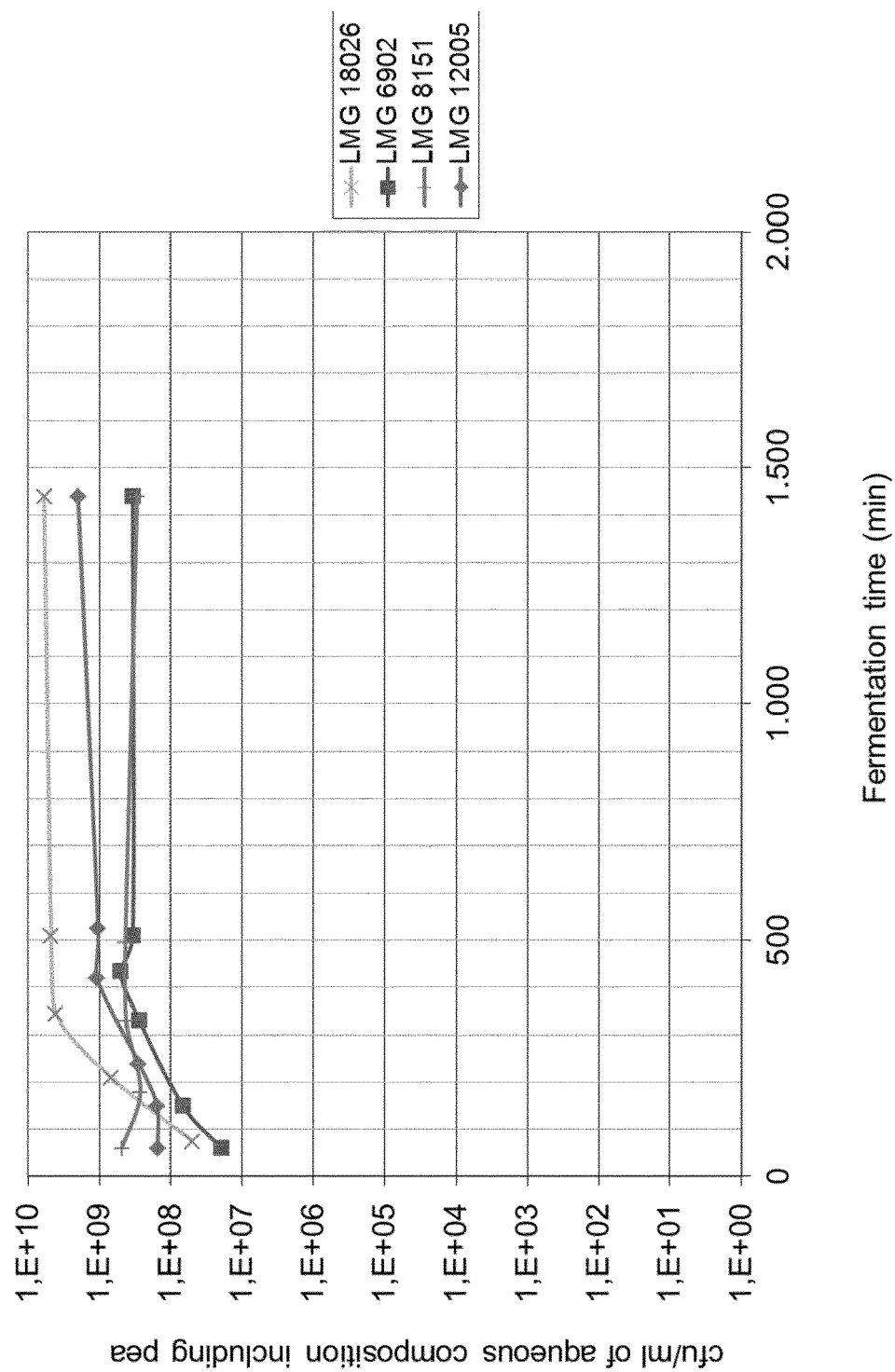
FIG. 10 represents a graph plotting the lactic acid bacteria (*Lactobacillus fermentum* LMG 18026, *Lactobacillus fermentum* LMG 6902, *Lactobacillus Acidophilus* LMG 8151, or *Lactobacillus Crispatus* LMG 12005) concentration of the aqueous solution (juice) as a function of the fermentation time.

| Products | Potassium Units (ppm/DM) | Magnesium (ppm/DM) |
|---|---|---|
| Product 2 | 518 | 3500 |
| Product 4 | 315 | 1200 | protein purity was diminished by 1.5% in the protein extracts prepared without fermentation step (86.0% protein on dry basis) compared to the protein extracts prepared with fermentation step (87.3% protein on dry basis)

sugar content was increased about 3 times in protein extracts prepared without inclusion of the fermentation step (1.40% of sugars on dry basis) compared to protein extracts prepared with inclusion of the fermentation step (0.45% of sugars on dry basis). Sugar content was based on the total concentration of glucose, fructose, saccharose, verbascose, raffinose, stachyose, and galactose.

viscosity was decreased about 3.5 times and 2.5 times respectively at pH 7.8 and pH 6.4 in protein extracts prepared with the fermentation step compared to protein extracts prepared without fermentation step (see also FIG. 6).

The viscosity measured for each extract at different pH is given in Table 6 and the viscosity profile is shown in FIG. 6.

TABLE 6

| | Viscosity (cP) | | | | |
|---|---|---|---|---|---|
| Product | pH 7.8 | pH 6.4 | pH 6.2 | pH 6 | pH 5.8 |
| Product 1 | 15813 | 21653 | 26133 | 33680 | 35667 |
| Product 2 | 13627 | 24507 | 28000 | 31653 | 33307 |
| Product 3 | 3931 | 9179 | 14738 | 23176 | 25748 |
| Product 4 | 4195 | 9020 | 13873 | 20800 | 27200 | the color of the dried protein extract was slightly more pink/orange in extracts prepared without the fermentation step compared to extracts prepared with fermentation step based on visual observation; also the color of the protein extracts when dispersed (4 wt % solution in water) was slightly more orange in extracts prepared without the fermentation step compared to extracts prepared with fermentation step.

the taste of the protein extract when dispersed (4 wt % solution in tap water) was determined to be more bitter and astringent in extracts prepared without the fermentation step compared to extracts prepared with fermentation step.

Example 6: Food Products Comprising Pea Proteins According to the Invention

Inclusion of pea proteins in various food products was evaluated.

1. Biscuits

Doughs for biscuit were prepared. Pea proteins A were prepared as described below.

Peas harvested dry, herein referred as "dry peas" (having a dry matter content (based on weight) of about 87%) were sieved and destoned by passage through a destoner. Subsequently, the peas were dehulled in a dehuller.

The peas were next subjected to fermentation with lactic acid bacteria (with *Lactobacillus fermentum*). Hereto the peas were soaked in drinkable water in a batchwise fashion. In subsequent batches, part of the fermentation medium (aqueous phase excluding peas) of a previous batch was used as an inoculum to effect subsequent fermentation. Peas were subjected to fermentation in the presence of $10^8$ cfu of lactic acid bacteria per ml of aqueous composition comprising peas. 400 kg of peas per $m^3$ of total volume of aqueous composition comprising peas were placed in a vessel. Fermentation was effected anaerobically in a closed vessel without degassing at a temperature of about 40° C., until a pH in the peas of 4.7 was reached. During fermentation, the aqueous phase in the fermentation vessel was recirculated at about 20 $m^3$/hour. The peas were fermented for a duration of about 430 min. At the end of fermentation, the peas had absorbed water in a quantity of about their initial mass before fermentation and had a dry matter content of about 47% (based on weight).

After fermentation, the peas were removed from the fermentation medium. The peas were then placed in a perforated rotating drum and washed to remove the remaining fermentation medium. After cleaning, the peas were subjected to wet milling. During milling, additional drinkable water was added such that the final composition had a dry matter content of about 25% (on weight basis). During the milling step, the pH was adjusted to about 8 by addition of sodium hydroxide.

After milling, the milled pea paste was subjected to centrifugal decantation. The supernatant containing proteins and soluble impurities (also referred herein as aqueous composition comprising pea proteins) had a dry matter content of about 4% (on weight basis).

The aqueous composition comprising pea proteins was subsequently subjected to heat treatment at 75° C. for 15 sec in a plate heat exchanger.

Subsequently, the pea proteins were concentrated by isoelectric precipitation. Hereto, the pH of the aqueous composition comprising pea proteins was adjusted to 4.8 with sulfuric acid. Separation of the precipitated/aggregated proteins was performed by centrifugal decantation. The resulting pea proteins concentrate was obtained as an aqueous slurry having a dry matter content of about 25% (based on weight).

The dry matter content of the aqueous slurry was adjusted to about 16% (on weight basis) after water addition; followed by adjustment of the pH of the slurry with sodium hydroxide until a pH of about 7.4 was reached. The slurry was subsequently subjected to a heat treatment at a temperature of about 90° C. for about 7 minutes; and then spray dried so as to obtain a powder (Pea proteins A) having a dry matter content of about 95% (weight basis).

The dough was prepared as shown in Table 7

TABLE 7

| Ingredients | (g) |
|---|---|
| Vegetable fat (Palm) | 6.49 |
| Icing sugar (5% starch) | 10.38 |
| Glucose syrup 38 DE | 1.48 |
| Salt | 0.26 |
| Sorbitol syrup | 1.11 |
| Mix for 2 minutes on first gear (106 rpm) | |
| Water | 30.63 |
| Ammonium bicarbonate | 0.20 |
| Sodium bicarbonate | 0.20 |
| Adding water in two steps and Mixing for 2 × 1 minute at 106 rpm | |
| Wheat flour | 37.12 |
| Sodium pyrophosphate | 0.13 |
| Pea proteins A | 12.00 |
| Mixing for 1 minute at 106 rpm and for 15 seconds at 196 rpm | |
| Weight (g) | 100.00 |

An analysis of the dough is given in Table 8.

TABLE 8

| | Dough 1 |
|---|---|
| pH dough | 7.3 |
| Observations process | Dough texture was soft enough, laminating was sufficient |
| $A_w$ biscuits (%) (water activity) | 15.5 |

2. Fudge Bars

Fudge bar recipes are shown in Table 9.

TABLE 9

| Ingredients | (g) |
|---|---|
| Inverted sugar syrup | 17.22 |
| Pea proteins A | 15.00 |

TABLE 9-continued

| Ingredients | (g) |
|---|---|
| Milk proteins - Nutrilac DR-7015V | 12.00 |
| Oligofructose syrup - Fibrulose L85 | 11.10 |
| Glucose syrup 38 DE | 10.00 |
| Calcium caseinate - Protilight | 5.00 |
| Sorbitol syrup | 3.00 |
| Dried cranberries | 3.00 |
| Sunflower oil | 2.20 |
| Glycerin | 2.00 |
| Hydrogenated vegetable fat | 2.00 |
| Calcium citrate | 1.6611 |
| Maltodextrines 18 DE | 1.072 |
| Magnesium citrate | 0.4672 |
| Salt | 0.15 |
| Soy lecithin | 0.10 |
| Raspberry aroma - Raspberry 54428 A7 | 0.03 |
| Dark chocolate (coating) | 14.00 |
| Total (g) | 100 |

Process for preparing the bars was as follows

Melting the fat at 45° C. in a water bath

Mixing the syrups and adding the fat

Mixing the powders in a Hobart

Adding the syrups and stirring for a few minutes until a homogeneous paste was obtained the dough was placed in a plastic bags and spread, letting rest overnight Cutting the bars and coating them with chocolate The pH, Aw (water activity), and hardness of the fudge bars over time (months) were measured and the results are illustrated respectively in Tables 10, 11, and 12.

TABLE 10

| pH | |
|---|---|
| T0 | 6.19 |
| Month 1 (M1) | 6.11 |
| Month 2 (M2) | nd |
| Month 3 (M3) | 6.34 |
| Month 6 (M6) | 6.27 |
| Month 12 (M12) | nd |

TABLE 11

| Aw | |
|---|---|
| T0 | 0.654 |
| M1 | 0.656 |
| M2 | 0.655 |
| M3 | 0.660 |
| M6 | 0.647 |
| M12 | nd |

TABLE 12

| Hardness | |
|---|---|
| T0 | 1106 |
| M1 | 1610 |
| M2 | 1853 |
| M3 | 1929 |
| M6 | 2228 |
| M12 | 3284 |

Example 7: Comparative Studies of Peas Fermented with Different *Lactobacillus* Strains (*Lactobacillus fermentum* LMG 6902, *Lactobacillus fermentum* LMG 18026, *Lactobacillus Crispatus* LMG 12005 or *Lactobacillus Acidophilus* LMG 8151)

Peas harvested dry, herein referred as "dry peas" (having a dry matter content (based on total weight of dry peas) of about 87% were sieved and destoned by passage through a destoner. Subsequently, the peas were dehulled in a dehuller.

The peas were next subjected to fermentation with lactic acid bacteria (*Lactobacillus fermentum* LMG 6902, *Lactobacillus fermentum* LMG 18026, *Lactobacillus Crispatus* LMG 12005 or *Lactobacillus Acidophilus* LMG 8151). Hereto 2000 g peas were soaked in 3663 g sterilized demineralized water at a temperature of 40° C., in a vessel. The fermentation medium comprising the recited bacterial strains was added in the same time. The vessel was in a thermostated bath and a pump, in order to recirculating the aqueous phase at about 250 ml/min, was added.

For *Lactobacillus fermentum* LMG 6902 and *Lactobacillus fermentum* LMG 18026 (both were obtained from BCCM/LMG Laboratorium voor Microbiologie, Universiteit Gent (UGent) Belgium), the fermentation medium was prepared as it is described in the procedure provided by the BCCM (F109C Revival of freeze-dried cultures; recommended medium 66). 37 ml of the fermentation medium was then added to the vessel.

For *Lactobacillus crispatus* LMG 12005 (50 Bn) and *Lactobacillus Acidophilus* LMG 8151 (100 Bn) (both were obtained from THT s.a. Gembloux, Belgium), the fermentation medium was prepared by putting 37 g of *Lactobacillus* flakes directly in the vessel.

Peas were subjected to fermentation in the presence of about $10^8$ cfu of lactic acid bacteria per ml of aqueous composition comprising peas. Fermentation was effected in a closed vessel without degassing at a temperature of about 40° C.

FIGS. 7-10 respectively illustrate the evolution of sugar content, pH, acidity, and lactic acid bacterial concentration as a function of fermentation time.

The invention claimed is:

1. A method for extracting pea proteins, comprising the steps of:
   (a) subjecting an aqueous composition comprising peas to fermentation;
   (b) milling said peas;
   (c) fractionating said milled peas so as to obtain at least one protein comprising fraction; and;
   (d) isolating pea proteins from said at least one protein comprising fraction.

2. The method according to claim 1, wherein said peas in step (a) are subjected to fermentation until the pH in said peas is at most 5.5, or at most 5.0, or ranging from 3.5 to 5, as measured at room temperature on 1 g of said peas which have been milled and suspended in 9 g of water.

3. The method according to claim 1, wherein said peas in step (a) are subjected to fermentation until the pH in said peas is reduced by at least 1 pH unit, or by at least 1.5 pH unit, as measured at room temperature on 1 g of said peas which have been milled and then suspended in 9 g of water.

4. The method according to claim 1 wherein step (a) comprises adding dry peas and/or dehulled peas to an aqueous solution.

5. The method according to claim 1, wherein step (a) comprises fermenting said peas until they have a dry matter content ranging from 35% to 60% based on the total weight of the peas.

6. The method according to claim 1, wherein said peas after step (a) and before step (b) have a dry matter content ranging from 35% to 60% based on the total weight of the peas.

7. The method according to claim 1, wherein said peas in step (a) are subjected to fermentation for at least 3 h, and at most 24 h.

8. The method according to claim 1, wherein said peas in step (a) are subjected to fermentation at a temperature ranging from 30° C. to 50° C., or from 35° C. to 45° C.

9. The method according to claim 1, wherein step (a) comprises fermenting said peas with one or more *Lactobacillus* sp.

10. The method according to claim 1, wherein said peas in step (a) are subjected to fermentation in the presence of at least $10^2$ cfu to $10^{10}$ cfu of lactic acid bacteria per ml of said aqueous composition comprising peas.

11. The method according to claim 1, wherein fractionating said milled peas in step (c) comprises separating at least part of the proteins comprised in the peas from the rest of the pea.

12. The method according to claim 1, wherein fractionating said milled peas in step (c) comprises adjusting the pH of the milled peas to a pH of at least 6, or at least 7, or at least 8 and at most 9.

13. The method according to claim 1, wherein fractionating said milled peas in step (c) comprises subjecting said milled peas to one or more decantation steps.

14. The method according to claim 1, wherein isolating pea proteins from said protein comprising fraction of step (d), comprises concentrating said pea proteins.

15. The method according to claim 1, wherein isolating pea proteins from said protein comprising fraction of step (d), comprises at least one of precipitation, flocculation, filtration, and/or chromatography step.

16. The method according to claim 1, wherein step (a) subjecting an aqueous composition comprising peas to fermentation is carried out in the presence of lactic acid bacteria.

17. The method according to claim 4, wherein dry peas have a dry matter content ranging from 80% to 95% based on the total weight of the dry peas.

18. The method according to claim 11, wherein fractionating said milled peas in step (c) comprises separating at least part of the proteins comprised in the peas from the rest of the pea in a fraction comprising at least 50 wt. % of protein based on the total dry matter of said fraction.

19. The method according to claim 13, wherein fractionating said milled peas in step (c) comprises subjecting said milled peas to one or more centrifugal decantation steps.

* * * * *